US009420599B2

(12) United States Patent
Ko et al.

(10) Patent No.: US 9,420,599 B2
(45) Date of Patent: Aug. 16, 2016

(54) SYNCHRONIZED ACTIVITY BITMAP GENERATION METHOD FOR CO-LOCATED COEXISTENCE (CLC) DEVICES

(75) Inventors: Li-Chun Ko, Taipei (TW); Hong-Kai Hsu, Taipei County (TW); Chi-Chen Lee, Taipei (TW); I-Kang Fu, Kaohsiung County (TW); Jiun-Jang Su, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 563 days.

(21) Appl. No.: 12/730,425

(22) Filed: Mar. 24, 2010

(65) Prior Publication Data

US 2011/0235621 A1    Sep. 29, 2011

(51) Int. Cl.
*H04W 72/12* (2009.01)
*H04W 88/06* (2009.01)

(52) U.S. Cl.
CPC .......... *H04W 72/1215* (2013.01); *H04W 88/06* (2013.01)

(58) Field of Classification Search
USPC ................................................. 370/328–338
See application file for complete search history.

(56) References Cited

U.S. PATENT DOCUMENTS

| 7,929,468 | B2 * | 4/2011 | Goldhamer | .................... | 370/280 |
| 8,059,622 | B2 * | 11/2011 | Zhu | ................................. | 370/338 |
| 8,107,413 | B2 * | 1/2012 | Lee et al. | ........................ | 370/326 |
| 2002/0142779 | A1 | 10/2002 | Goto et al. | | |

(Continued)

FOREIGN PATENT DOCUMENTS

| CN | 101253735 | 8/2008 |
| CN | 101621324 | 1/2010 |

(Continued)

OTHER PUBLICATIONS

"Part 16: Air Interface for Fixed and Mobile Broadband Wireless Access Systems: Amendment 2: Physical and Medium Access Control Layers for Combined Fixed and Mobile Operation in Licensed Bands and Corrigendum 1" IEEE Standard for Local and Metropolitan Area Networks; IEEE Computer Society and the IEEE Microwave Theory and Techniques Society; IEEE Std 802.16e-2005 and IEEE Std 802.16/2004/Cor1-2005,pp. 112-117 and pp. 228-234; Feb. 28, 2006.

(Continued)

*Primary Examiner* — Marcus R Smith
*Assistant Examiner* — Omeed D Rahgozar
(74) *Attorney, Agent, or Firm* — McClure, Qualey & Rodack, LLP

(57) ABSTRACT

A mobile communications device is provided. A first radio module communicates with a communications device in compliance with a first protocol. A second radio module communicates with a base station in compliance with a second protocol. A CLC radio manager receives a traffic pattern from the first radio module indicating a first traffic allocation for the first radio module, obtains timing information of the base station, obtains a native reference clock from a clock source, converts values of the traffic pattern into the native reference clock counts, aligns the converted traffic pattern with the timing information of the base station, generates one or more CLC bitmaps for the first radio module by converting the aligned traffic pattern into a plurality of WiMAX frames or sub-frames of the timing information, and transmits the generated CLC bitmaps to the base station to recommend a second traffic allocation of the frames or sub-frames.

23 Claims, 16 Drawing Sheets

(56) References Cited

U.S. PATENT DOCUMENTS

| | | |
|---|---|---|
| 2004/0170134 A1 | 9/2004 | Furuyama et al. |
| 2006/0292987 A1 | 12/2006 | Ophir et al. |
| 2007/0021066 A1 | 1/2007 | Dravida et al. |
| 2007/0058524 A1* | 3/2007 | Modlin et al. ............... 370/208 |
| 2007/0086474 A1 | 4/2007 | Lee et al. |
| 2007/0099653 A1 | 5/2007 | Parron et al. |
| 2007/0275746 A1* | 11/2007 | Bitran ......................... 455/509 |
| 2008/0004002 A1 | 1/2008 | Chin et al. |
| 2009/0003257 A1 | 1/2009 | Kumar et al. |
| 2009/0052128 A1 | 2/2009 | Yeh et al. |
| 2009/0081962 A1 | 3/2009 | Sohrabi |
| 2009/0088199 A1 | 4/2009 | Nurminen et al. |
| 2009/0141692 A1 | 6/2009 | Kasslin et al. |
| 2009/0213804 A1* | 8/2009 | Yoon et al. ................... 370/329 |
| 2009/0219904 A1* | 9/2009 | Khairmode et al. .......... 370/338 |
| 2009/0252128 A1 | 10/2009 | Yang et al. |
| 2009/0257379 A1* | 10/2009 | Robinson et al. ............. 370/329 |
| 2010/0056136 A1* | 3/2010 | Zhu ............................ 455/426.1 |
| 2010/0061326 A1 | 3/2010 | Lee et al. |
| 2010/0135256 A1* | 6/2010 | Lee et al. ...................... 370/336 |

FOREIGN PATENT DOCUMENTS

| | | |
|---|---|---|
| CN | 101646245 | 2/2010 |
| EP | 1 641 308 | 3/2006 |
| JP | 9-512409 | 12/1997 |
| WO | WO 2007008981 | 1/2007 |
| WO | 2007031554 A1 | 3/2007 |
| WO | 2007070409 A1 | 6/2007 |
| WO | WO 2007070409 | 6/2007 |
| WO | WO 2008056804 | 5/2008 |
| WO | WO 2008078311 | 7/2008 |

OTHER PUBLICATIONS

English language translation of abstract of CN 101253735 (published Aug. 27, 2008).

International Search Report dated Dec. 30, 2010.

English language translation of abstract of CN 101621324 (published Jan. 6, 2010).

English language translation of abstract of CN 101646245 (published Feb. 10, 2010).

Chiasserini, C., et al.; "Coexistence Mechanisms for Interference Mitigation in the 2.4-ghz ISM Band;" IEEE Transactions on Wireless Communications, IEEE Service Center; vol. 2; No. 5; Sep. 2003; pp. 964-975.

English language translation of abstract of JP 9-512409 (published Dec. 9, 1997).

* cited by examiner

SYNCHRONIZED ACTIVITY BITMAP GENERATION METHOD FOR CO-LOCATED COEXISTENCE (CLC) DEVICES

BACKGROUND OF THE INVENTION

1. Field of the Invention

The invention relates generally to a method for coordinating the operations of a plurality of wireless communications modules in a communications device, and more particularly to a synchronized activity bitmap generation method for coordinating the operations of a plurality of wireless communications modules in a communications device to avoid signal interference.

2. Description of the Related Art

With growing demand for ubiquitous computing and networking, different wireless communications technologies, such as Bluetooth (BT), Wireless Fidelity (WiFi), Worldwide Interoperability for Microwave Access (WiMAX), and others, have been developed and are available for users to use. More than one wireless communications module may be integrated into a single mobile communications device, to provide multiple wireless communications system functions and portability. In this regard, overlapping or adjacent operating frequency bands employed by different wireless communications modules, may cause transmission performances thereof to degrade. Table 1 below shows the operating frequency bands for WiMAX, WiFi and BT.

TABLE 1

| Category of Wireless communications technology | | |
|---|---|---|
| Usage | Wireless Communications service | Operating frequency band |
| Wide Area Network (WAN) | WiMAX | 2.300-2.400 GHz |
| | | 2.496-2.690 GHz |
| | | 3.300-3.800 GHz |
| Local Area Network (LAN) | WiFi | 2.412-2.4835 GHz |
| | | 4.9-5.9 GHz |
| Personal Area Network (PAN) | Bluetooth | 2.402-2.480 GHz |

As shown in Table 1, the operating frequency bands of WiFi and BT overlap with each other. Specifically, the operating frequency bands of WiFi and BT are adjacent to that of WiMAX. When multiple wireless communications modules using these wireless communications technologies are integrated into a mobile communications device, simultaneous operations thereof may cause signal interference there among. Therefore, a method for coordinating the operations of a plurality of wireless communications technologies in a communications apparatus is highly required.

BRIEF SUMMARY OF THE INVENTION

In light of the previously described problems, there exists a need for a method to coordinate the operations of a plurality of wireless communications technologies in a mobile communications device to avoid signal interference.

One aspect of the invention discloses a mobile communications device comprising a clock source, a first radio module, a second radio module, and a co-located coexistence (CLC) radio manager. The first radio module communicates with a communications device in compliance with a first protocol. The second radio module communicates with a base station in compliance with a second protocol. The CLC radio manager receives a traffic pattern from the first radio module indicating a first traffic allocation for the first radio module, obtains timing information of the base station, obtains a native reference clock from the clock source, converts values of the traffic pattern into the native reference clock counts, and aligns the converted traffic pattern with the timing information of the base station. The CLC radio manager also generates one or more CLC bitmaps for the first radio module by converting the aligned traffic pattern into a plurality of WiMAX frames or sub-frames of the timing information, and transmits the generated CLC bitmaps to the base station via the second radio module to recommend a second traffic allocation of the frames or sub-frames.

Another aspect of the invention discloses a mobile communications device comprising a first radio module, a second radio module, and a co-located coexistence (CLC) radio manager. The first radio module communicates with a communications device in compliance with a first protocol. The second radio module communicates with a base station in compliance with a second protocol according to timing information of the base station. The CLC radio manager detects activities of the first radio module, and receives a traffic pattern from the first radio module indicating a first traffic allocation for the first radio module. The CLC radio manager also generates one or more CLC bitmaps of the first radio module by synchronizing the traffic pattern with the timing information of the base station, and transmits the generated CLC bitmaps to the base station via the second radio module to recommend a second traffic allocation of a plurality of sub-frames or frames for the second radio module.

Yet another aspect of the invention discloses a synchronized activity bitmap generation method for a CLC device. The CLC device comprises a first radio module communicating with a peer communications device in compliance with a first protocol, and a second radio module communicating with a base station in compliance with a second protocol according to timing information of the base station. The synchronized activity bitmap generation method comprises obtaining a traffic pattern indicating a first traffic allocation for the first radio module, synchronizing the traffic pattern with the timing information of the base station, generating one or more Co-Located Coexistence (CLC) bitmaps of the first radio module according to the synchronized results, and transmitting the generated CLC bitmaps to the base station via the second radio module to recommend a second traffic allocation of a plurality of WiMAX frames or sub-frames for the second radio module.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
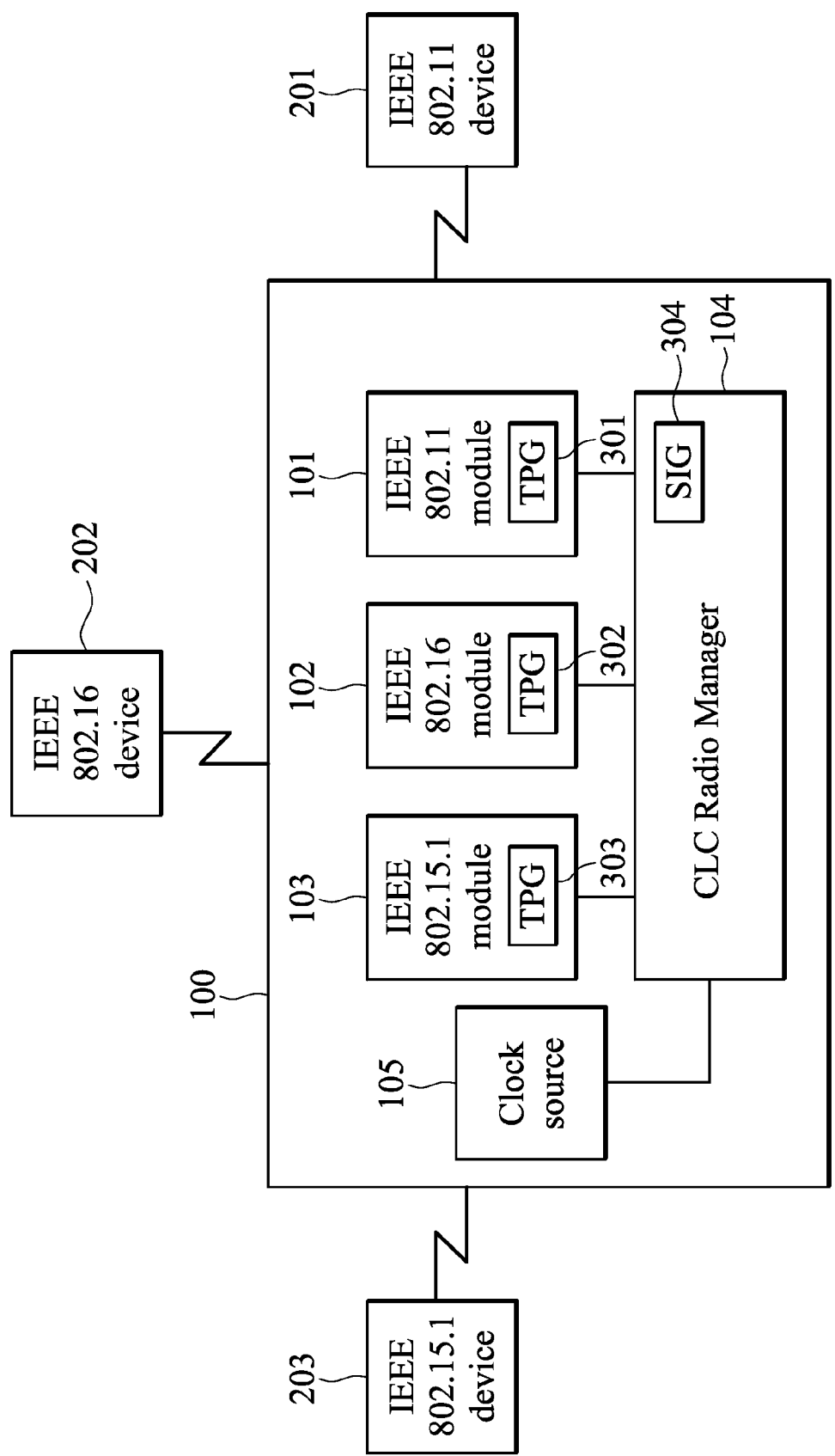
FIG. 1 is a schematic diagram illustrating a multi-radio communications system according to an embodiment of the invention.

FIG. 1 is a schematic diagram illustrating a multi-radio communications system according to an embodiment of the invention. A mobile communications device 100 comprises an IEEE 802.11 radio module 101, an IEEE 802.16 radio module 102, an IEEE 802.15.1 radio module 103, a Co-located Coexistence (CLC) Radio Manager 104, and a clock source 105. The IEEE 802.11 radio module 101 provides communications between the mobile communications device 100 and an IEEE 802.11 device 201 in compliance with the IEEE 802.11 protocol via air interface. The IEEE 802.11 device 201 may be, as an example, an IEEE 802.11 Base Station (BS), Access Point (AP), or Station (STA). The IEEE 802.11 module 101 may be an IEEE 802.11 BS, AP, or STA, operated as a router to enable the IEEE 802.11 device 201 to connect to the Internet through an IEEE 802.16 device 202. The IEEE 802.16 radio module 102 provides communications between the mobile communications device 100 and the IEEE 802.16 device 202 in compliance with the IEEE 802.16 protocol via air interface. The IEEE 802.16 device 202 may be, as an example, an IEEE 802.16 BS or Relay Station (RS). The IEEE 802.15.1 radio module 103 provides communications between the mobile communications device 100 and an IEEE 802.15.1 device 203 in compliance with IEEE 802.15.1 protocol via air interface. The IEEE 802.15.1 device 203 may be, as an example, a BT handset. The CLC Radio Manager 104 provides interfaces between the IEEE 802.16 radio module 102 and other CLC radio modules, and detects activities of the IEEE 802.16 radio module 102 and other CLC radio modules for coordinating the operations therebetween. The CLC radio modules refer to the radio modules that are co-located and coexist in the mobile communications device 100 with the IEEE 802.16 radio module 102, such as the IEEE 802.11 radio module 101 and the IEEE 802.15.1 radio module 103. Interference to the IEEE 802.16 radio module 102 may be caused when any one of the CLC radio modules is transmitting and/or receiving radio signals. The mobile communications device 100 may be a notebook, a cellular phone, a portable gaming device, a portable multimedia player, a Global Positioning System (GPS), a receiver, or any other mobile electronic devices in which multiple radio modules may be included. In some embodiments, each of the radio modules may comprise an antenna to transceive radio signals. In other embodiments, one antenna may be designed to be shared among all the radio modules to improve area efficiency. However, the invention should not be limited thereto. The clock source 105 may be a VOXO (voltage-controlled crystal oscillator), a VCTXO (voltage controlled temperature compensated crystal oscillator), a DCXO (digitally controlled crystal oscillator), or others, to provide a native reference clock to the CLC radio manager 104. Note that the clock source 105 may alternatively be disposed in one of the modules 301 to 303, and the invention should not be limited thereto.

The IEEE 802.11 is a set of standards specifying Wireless Local Area Network (WLAN) in the 2.4, 3.6 and 5 GHz frequency bands. A WLAN module, such as the IEEE 802.11 radio module 101, included in the mobile communications device 100 may be used to wirelessly connect to the Internet to browse web pages, transceive e-mails, chat on-line, download multimedia content, or others. Typically, the WLAN is implemented as an extension to wired LANs within a building and can provide the final few meters of connectivity between a wired network and mobile or fixed devices. Most WLANs may operate in the 2.4 GHz license-free frequency band and have throughput rates of up to 2 Mbps. Meanwhile, the 802.11b standard is a direct sequence, and provides throughput rates of up to 11 Mbps and the 802.11g standard operates at a maximum raw data rate of 54 Mbit/s, or at a net throughput of about 19 Mbit/s. The WLAN modules connect users to the LAN via an AP. The APs provide receiving, buffering, and transmitting of data between WLAN modules and the wired network infrastructure. Each AP may support, on average, twenty devices and have a coverage varying from 20 meters in area with obstacles (walls, stairways, elevators) and up to 100 meters in area with clear lines of sight.

Figure 2:
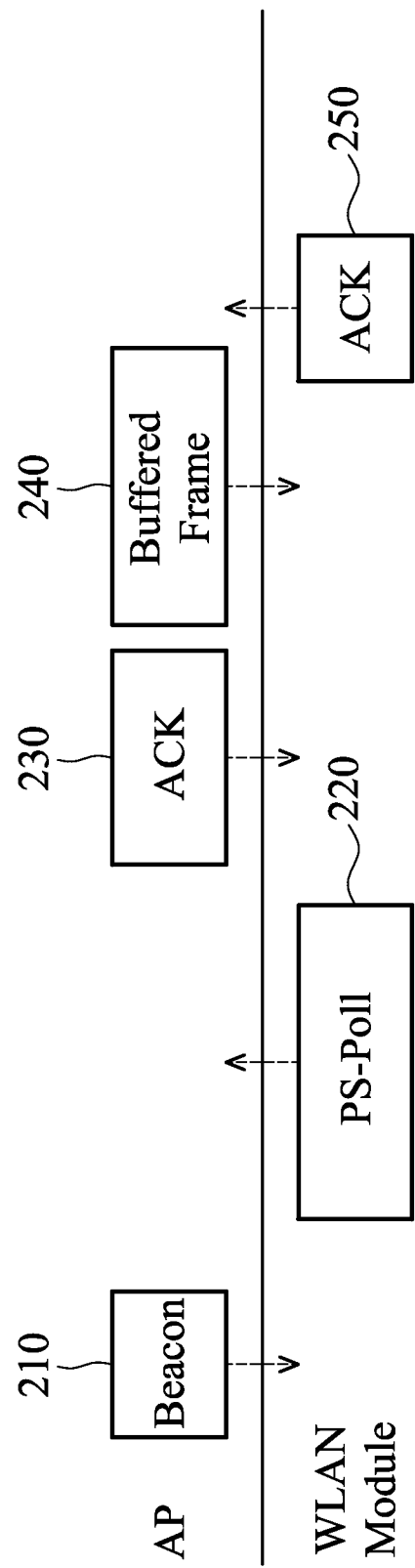
FIG. 2 is a schematic diagram illustrating the frame exchanges for obtaining buffered packets in a time line.

Generally, there are three steps for a WLAN module to obtain access to an AP, including active/passive scanning, authentication and association, and enabling the WLAN module to associate with an AP. Active scanning is used by the WLAN module to scan surrounding wireless networks and locate a compatible one, while passive scanning is used to discover any surrounding wireless networks by listening to the beacon frames periodically sent by an AP. Periodically, the AP transmits a beacon frame 210 containing all the information about the presence of a WLAN network. When passive scanning is used, the WLAN module prepares a list of channels and listens to beacon frames on each of the channels. In addition, the WLAN module is required to wake up periodically to receive the beacon frame. FIG. 2 is a schematic diagram illustrating the frame exchanges for obtaining buffered packets in a time line. When the WLAN module identifies that there are packets buffered at the AP upon reception of the beacon frame 210, the WLAN module requests for the packets by sending a PS-Poll request 220. After receiving a PS-Poll request 220, the AP replies with an acknowledgment (ACK) 230 and transmits the buffered frame 240 to the AP. Lastly, the WLAN module replies with an acknowledgment (ACK) 250 to the AP after successfully receiving buffered frame 240. Regarding detailed description of WLAN protocols, reference may be made to corresponding IEEE 802.11 standards and thus, omitted here for brevity.

Figure 3:
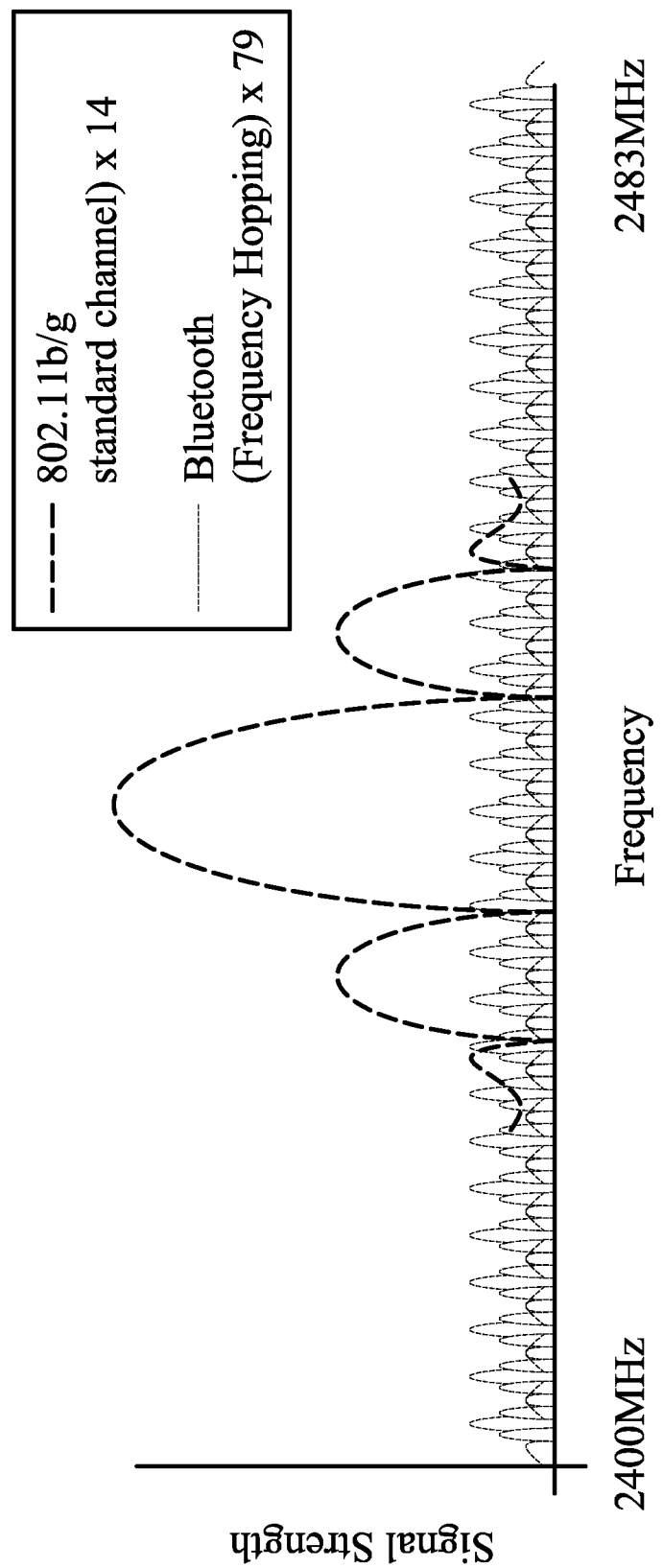
FIG. 3 is a schematic diagram illustrating frequency interference between WLAN and BT.

The IEEE 802.15 is the 15th working group of the IEEE 802 and specifies the Wireless Personal Area Network (PAN) standards. The IEEE 802.15.1 is a set of standards for Bluetooth (BT). BT is an open wireless protocol for exchanging data over short distances from fixed or mobile devices, creating PANs. As previously described, WLAN and BT systems both occupy a section of the 2.4 GHz Industrial, Scientific, and Medical (ISM) band, which is 83 MHz-wide. Referring to FIG. 3, BT uses Frequency Hopping Spread Spectrum (FHSS) and is allowed to hop between 79 different 1 MHz-wide channels in a band. WLAN uses Direct Sequence Spread Spectrum (DSSS) instead of FHSS, and its carrier remains centered on one channel, which is 22 MHz-wide. When the WLAN module (such as the IEEE 802.11 radio module 101) and the BT (such as the IEEE 802.15.1 radio module 103) are operating in the same area, the single 22 MHz-wide WLAN channel occupies the same frequency space as 22 of the 79 BT channels which are 1 MHz-wide. When a BT transmission occurs on a frequency that lies within the frequency space occupied simultaneously by a WLAN transmission, a certain level of interference may occur, depending on the strength of each signal.

Figure 4:
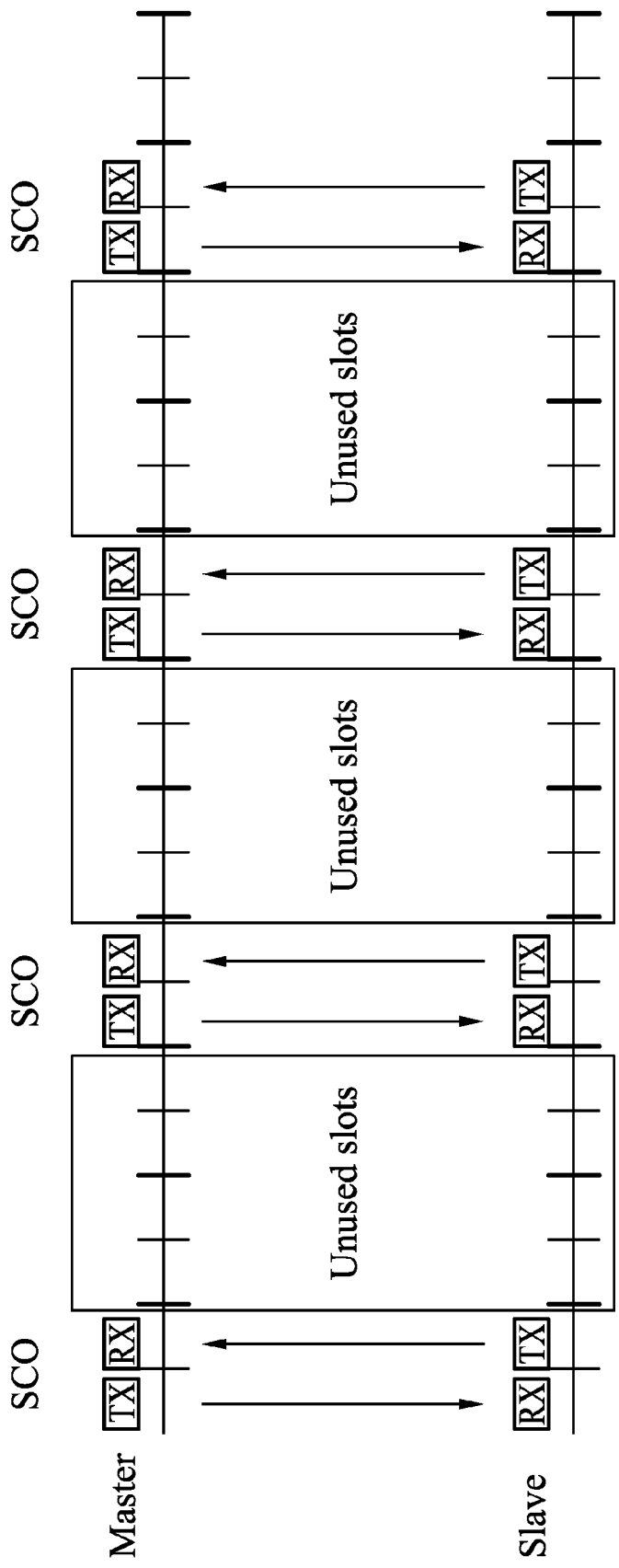
FIG. 4 is a schematic diagram illustrating BT HV3 packet transmissions at every six slots.

A BT device, such as the IEEE 802.15.1 device 203, may operate as a master device controlling the PAN, and the BT module (such as the IEEE 802.15.1 radio module 103) may operate as a slave device wirelessly connected to the master device. The BT device may perform an inquiry procedure to discover nearby devices or to be discovered by other devices in their locality. In the inquiry procedure, the BT device tries to find other nearby devices by actively sending inquiry requests, and the located BT devices reply by sending responses back to the initiated BT device. When a BT device is found, communications between the initiated and the located BT devices may be carried out. Two types of connections may be used for communications between a master device and a slave device. They are: 1). SCO/eSCO links, which are synchronous connection oriented/extended synchronous connection oriented; and 2). ACL links, which are asynchronous connection oriented. The SCO/eSCO link (also called synchronization link) is a symmetric, point-to-point link between a master device and a specific slave device. The master device maintains the SCO/eSCO link by using reserved slots at regular intervals. After establishing the SCO/eSCO link, some synchronous packets, such as HV (High quality Voice) and DV (Data Voice) packets, are typically used for voice transmissions and are not retransmitted. The master device sends synchronous packets at regular intervals, for example, every 2, 4 or 6 slots, depending on packet type used for transmission, where each slot is typically 625 µs. Typically, HV and DV packets are transmitted via the SCO link and EV packets are transmitted via the eSCO link. Exemplary HV3 packet transmissions at every six slots are depicted in FIG. 4. The ACL link (also called asynchronization link) is a point-multipoint link between the master device and all slave devices participating on a PAN. No slot is reserved for the ACL link. The master device establishes an ACL link on a per-slot basis to any slave device. After establishing the ACL link (i.e. entering connection state), ACL packets (such as DM, DH and AUX packets) are typically used for data transmission. Regarding detailed description of the BT protocols, reference may be made to the corresponding IEEE 802.15 standards and thus, omitted here for brevity.

Figure 5A:
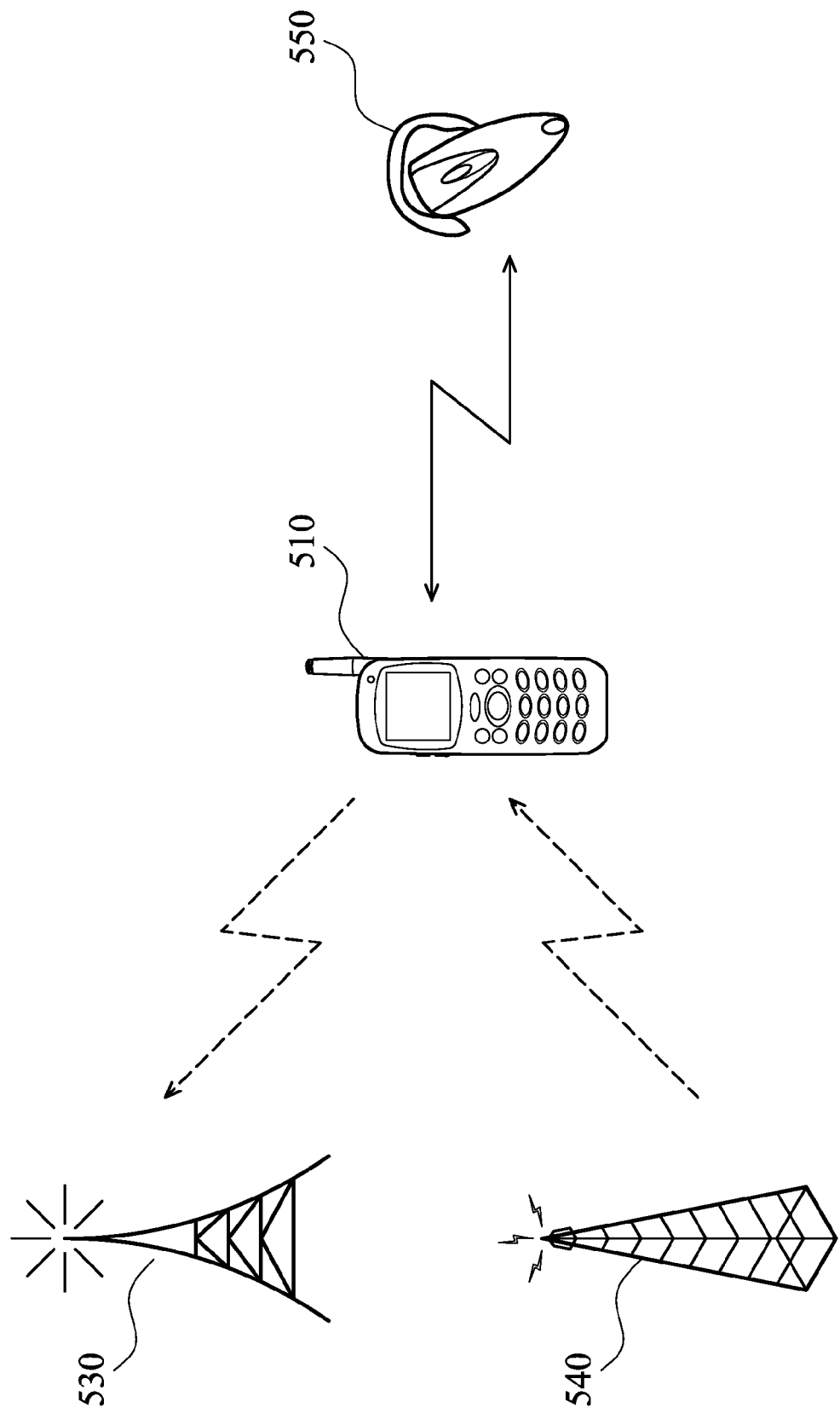
FIG. 5A to 5C show some exemplary multi-radio coexistence scenarios.
Figure 5B:
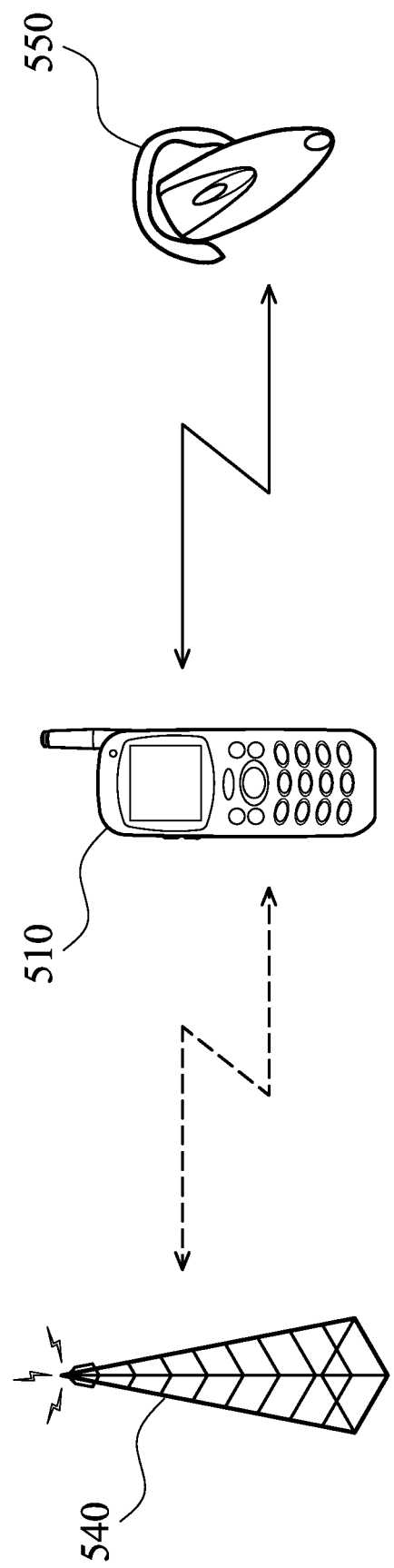
Figure 5C:
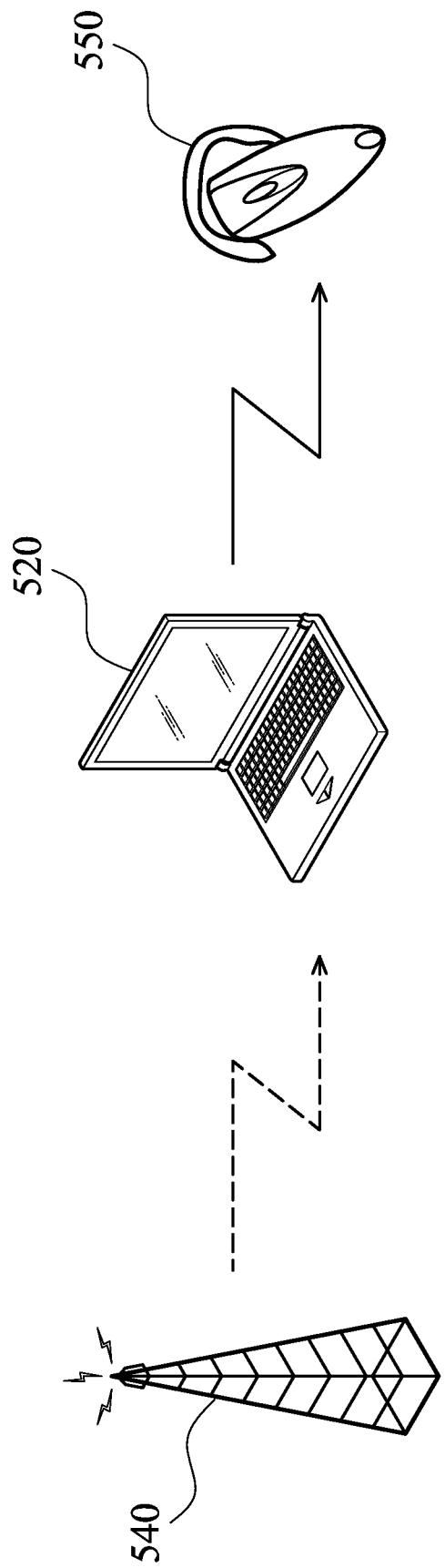

The IEEE 802.16 is a wireless broadband access standard for WiMAX, which is designed for outdoor, long-range, and carrier-class applications with high throughput. The 802.16 standard supports both licensed and license-exempt spectrums, wherein 802.16a specifies the operation in the 2-10 GHz band, supporting raw bit rates of up to 75 Mb/s with variable channel bandwidths of 1.5 MHz to 20 MHz. A WiMAX module (such as the IEEE 802.16 radio module 102) may use Orthogonal Frequency-Division Multiplexing (OFDM) technology with 20 MHz-wide bandwidth. The operating frequency band of WiMAX is close to the operating frequency bands of WLAN and BT as shown in Table 1. FIG. 5A to 5C shows exemplary multi-radio coexistence scenarios. The cellular phone 510 and laptop device 520 may be embodiments of the mobile communications device 100, and may comprise an IEEE 802.16 radio module providing WiMAX communications and at least one of an IEEE 802.15.1 radio modules provide BT communications, and an IEEE 802.11 radio module provides WLAN communications. For details of the hardware architecture of the co-located radio modules, reference may be made to FIG. 1 and corresponding descriptions and thus, omitted here for brevity.

Figure 6:
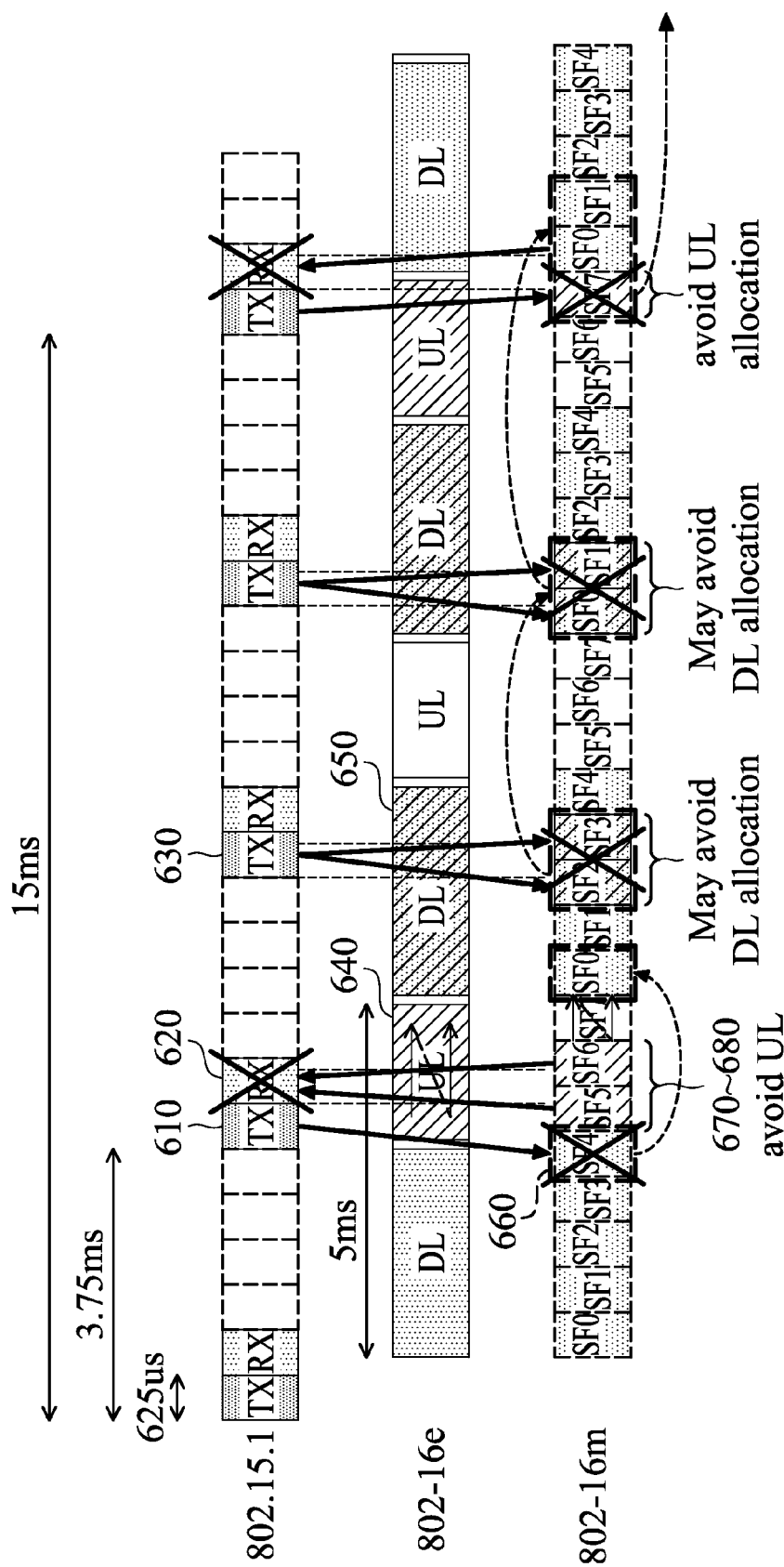
FIG. 6 shows exemplary traffic patterns of BT transmission (Tx) and reception (Rx) data frame allocations and WiMAX downlink (DL) and uplink (UL) data frame allocations.

As shown in FIG. 5A, the cellular phone 510 uses a full duplex voice call GSM communications service through a base station 530, while at the same time, performs Internet browsing over WiMAX via a base station 540. The cellular phone 510 may transmit the voice data through the established PAN to a BT handset 550 and receive speech signals captured by a microphone of the BT handset 550 via an embedded BT module (such as the IEEE 802.15.1 radio module 103 shown in FIG. 1). Because the WiMAX module (such as the IEEE 802.16 radio module 102 shown in FIG. 1) and Bluetooth module of the cellular phone 510 operate in adjacent frequency bands as previously described and are located in close physical proximity to one another as shown in FIG. 1, interference may occur therebetween. FIG. 6 shows exemplary traffic patterns of BT transmission (Tx) and reception (Rx) data frame allocation and WiMAX downlink (DL) and uplink (UL) data frame allocations. In a typical WiMAX frame structure, each 20 ms super-frame (SU) is divided into four equal-sized 5 ms radio frames, as employed in IEEE 802.16e. Specifically, when using the same OFDMA parameters with the channel bandwidth of 5 MHz, 10 MHz, or 20 MHz, each 5 ms radio frame further consists of eight sub-frames, as employed in IEEE 802.16m. As an example, assume a WiMAX module conforms to the IEEE 802.16e standard, when the WiMAX module transmits data via air interface to the base station 540 in the 802.16 frame 640, and the BT module at the same time receives data from the BT handset 550 via air interface in the 802.15.1 frame 620, the transmitted WiMAX data may be captured by the BT module and hence, interference may occur. Similarly, when the BT module transmits data via air interface to the BT handset 550 in the 802.15.1 frame 630, and the WiMAX module at the same time receives data from the base station 540 via air interface in the 802.16 frame 650, the transmitted BT data may be captured by the WiMAX module and hence, interference may occur. As an example, assume a WiMAX module conforms to the IEEE 802.16m standard, when the BT module transmits data via air interface to the BT handset 550 in the 802.15.1 frame 610, and the WiMAX module at the same time receives data from the base station 540 via air interface in the 802.16 sub-frame 660, the transmitted BT data may be captured by the WiMAX module and hence, interference may occur. Similarly, when the WiMAX module transmits data via air interface to the base station 540 in the 802.16 sub-frames 670 and 680, and the BT module at the same time receives data from the BT handset 550 via air interface in the 802.15.1 frame 620, the transmitted WiMAX data may be captured by the BT module and hence, interference may occur. The interference problem becomes more serious in a cellular phone 510, in which transmitted WiMAX data is captured by the BT module when the Tx power of the WiMAX module for long-distance transmission is much stronger than the Rx power accepted by the BT module.

FIG. 5B shows another scenario illustrating interference caused between the BT and WLAN modules. The cellular phone 510 may utilize a Voice over Internet Protocol (VoIP) communications service, while at the same time, the VoIP data from the Internet may be received through WLAN connection via the WLAN module (such as the IEEE 802.11 radio module 101 shown in FIG. 1), and vice versa. The cellular phone 510 may transmit the voice data through the established PAN to the BT handset 550 and receive speech signals captured by a microphone of the BT handset 550 via the BT module. Because both the WLAN module and BT module share spectrums as previously described and are located in close physical proximity to one another as shown in FIG. 1, interference may occur therebetween. FIG. 5C shows still another scenario illustrating interference caused between the BT and WiMAX modules. A laptop device 520 may receive multimedia streaming or data over WiMAX from the base station 540 and at the same time transmit audio data to the BT handset 550. The BT handset 550 may be employed as a wireless earphone to play music received from the laptop device 520 as shown in FIG. 5C. The laptop device 520 and the BT handset 550 may be compatible with the Advanced Audio Distribution Profile (A2DP), which is for transceiving uni-directional 2-channel stereo audio streams, such as an MPEG-1, MPEG-2, MPEG-4, Advanced Audio Coding (AAC), or Adaptive Transform Acoustic Coding (ATRAC) audio stream, or other audio streams, from the BT module of the laptop device 520 to the BT handset 550 using ACL links. Unfavorably, interference may occur between the WiMAX module and BT module since they both operate in adjacent frequency bands as previously described and are located in close physical proximity to one another as shown in FIG. 1. Therefore, in order to avoid interference therebetween, a method for coordinating the operations of the CLC radio modules in a communications device is highly required.

Referring back to FIG. 1, according to the embodiments of the invention, the IEEE 802.16 radio module 102 may provide protocols to support multi-radio coexistence operations. In an embodiment, the CLC Radio Manager 104 may provide interfaces for the radio modules 101, 102 and 103, detect activities of the radio modules 101, 102 and 103, collect the information (such as the time characteristics and radio characteristic) regarding the co-located radio activities directly from the corresponding CLC radio modules or an inter-radio interface internal to the mobile communications device 100, and generate management messages to a multi-radio coexistence processing module to respond with corresponding actions to support multi-radio coexistence operations. Note that the CLC Radio Manager 104 may alternatively be implemented inside of the radio modules 101, 102 and/or 103 and the invention should not be limited thereto.

According to the embodiments of the invention, the IEEE 802.16 radio module 102 and a base station (BS) (such as the base station 540) may communicate with each other via air interface. The IEEE 802.16 radio module 102 may generate management messages to report to the BS information about its co-located radio activities obtained directly from inter-radio interface or from the CLC Radio Manager 104, and the BS or RS may generate management messages to respond with the corresponding actions to the IEEE 802.16 radio module 102 to support multi-radio coexistence operation.

Figure 7:
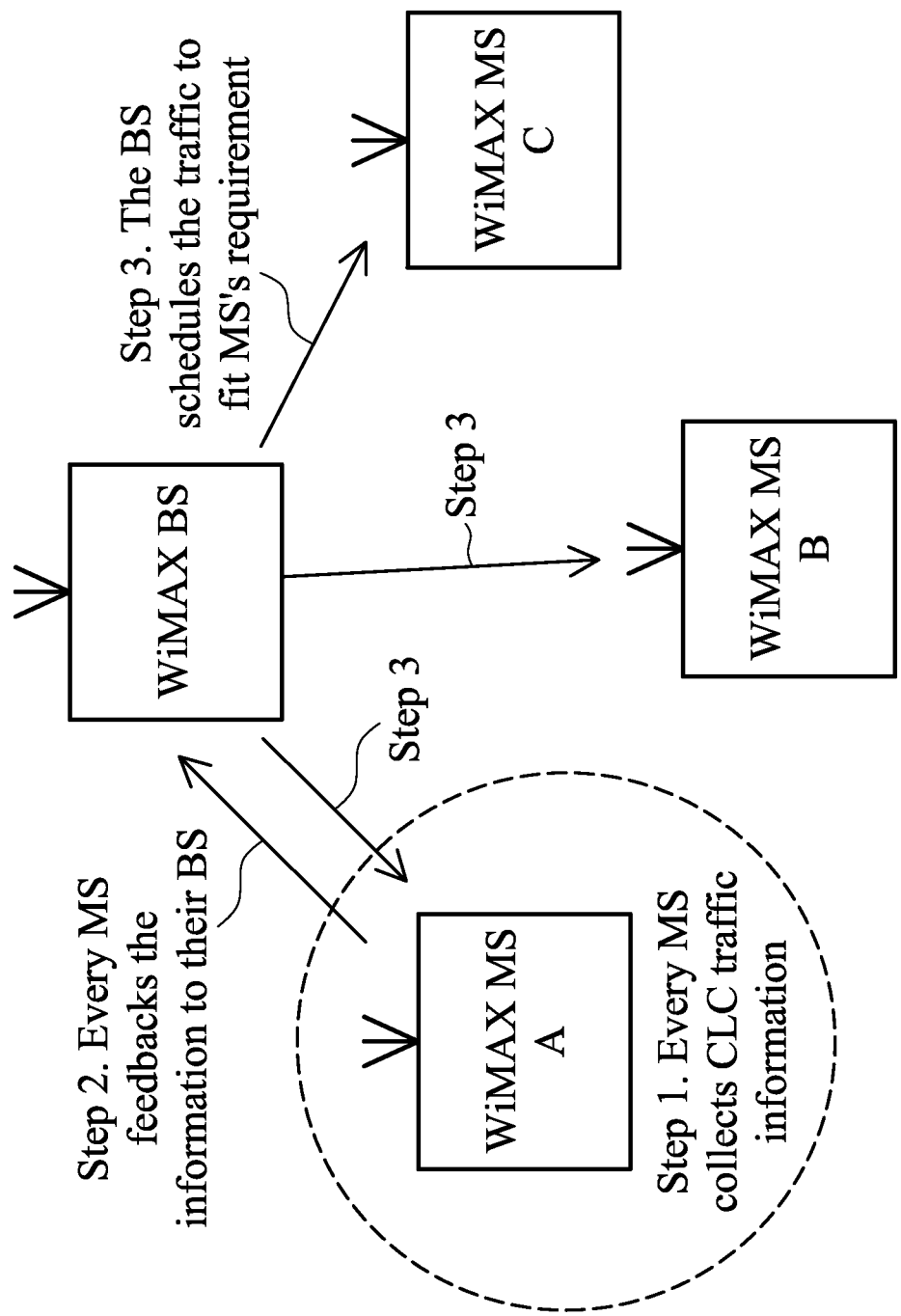
FIG. 7 is a schematic diagram illustrating the traffic pattern negotiation between a mobile communications device and a serving BS.

The mobile communications device 100 may conduct pre-negotiated periodic absences from the serving BS, such as the IEEE 802.16 device 202, to support concurrent operations of the 802.16 radio and co-located non-802.16 radios. The time pattern for such periodic absences may be negotiated between the mobile communications device 100 and the serving BS, as shown in FIG. 7. The mobile communications device 100 first detects the activities of the co-located non-802.16 radios, i.e. the CLC radios such as IEEE 802.11 radio module 101 and the IEEE 802.15.1 radio module 103, and collects CLC traffic information according to the detected activities of the co-located non-802.16 radios (Step 1). Once the CLC traffic information is collected, the mobile communications device 100 sends a CLC_Request to the serving BS to indicate activation of one or more CLC radio modules and request a period of absence according to the CLC traffic information included in the CLC_Request (Step 2). There may be more than one mobile communications devices within the communications range of a BS. As shown in FIG. 7, there are two other mobile communications devices served by the same BS. Each of the mobile communications devices may have co-located non-802.16 radios, and carry out the detection of activities of the co-located non-802.16 radios and indicating activation of the detected co-located non-802.16 radios to the serving BS, as previously described in Step 1 and Step 2 of the mobile communications device 100. Subsequently, the serving BS may schedule the traffic to fit the CLC traffic information included in the CLC_Request(s) from all of the mobile communications devices within the communications range (Step 3). Note that, when the serving BS accepts the CLC_Request(s), it is preferable to avoid data transmission between the serving BS and the 802.16 radios of the mobile communications devices during this period. That is to say, it is preferable that the radio resource of the mobile communications device 100 is reserved during this period for the activation of co-located non-802.16 radios to obtain corresponding radio characteristics. According to an embodiment of the invention, the radio characteristics of a CLC radio module may comprise a transmission power, reception sensitivity, a traffic pattern (such as the traffic pattern shown in FIG. 6), and so on. Afterwards, the WiMAX module 102 and/or the CLC radio manager 104 may further identify the obtained radio characteristics from the activated/activating CLC radio module. The mobile communications device 100 may send another CLC_Request to the serving BS to indicate deactivation of the co-located non-802.16 radios upon detecting that the CLC radio modules have been deactivated or to indicate that the initial setup or connection setup of the CLC radio modules has been completed. The data transmission between the serving BS and the mobile communications device 100 may resume thereafter.

According to the embodiments of the invention, the radio module may comprise a Traffic Pattern Generator (TPG) to generate a corresponding traffic pattern and the CLC radio manager 104 may comprise a Synchronization Information Generator (SIG) to coordinate between the traffic patterns obtained from different radio modules. As shown in FIG. 1, the IEEE 802.11 radio module 101 may comprise a TPG 301, the IEEE 802.16 radio module 102 may comprise a TPG 302, the IEEE 802.15.1 radio module 103 may comprise a TPG 303, and the CLC radio manager 104 may comprise the SIG 304. The SIG 304 may coordinate the traffic patterns of different radio modules according to reference clock(s) which is synchronized with the serving BS and received from the IEEE 802.16 radio module 102. A traffic pattern from one of the TPG 301, 302, and 303 may comprise an Rx/Tx indicator, a starting time, a duration, and a repeating interval. For example, the TPG 303 may generate a BT Tx HV3 traffic pattern, say {150 µs, 625 µs, 3750 µs}, wherein the first parameter represents a starting time for performing the HV3 traffic, the second parameter represents a duration of the HV3 traffic, and the third parameter represents a repeating interval of the HV3 traffic. That is, information carried by the Tx BT HV3 traffic pattern may indicate that the HV3 traffic of 625 µs may start after 150 µs and the HV3 traffic will be repeated every 3750 µs. As an example, the TPG 303 may output the HV3 radio activities by 150 µs earlier than the start of the HV3 traffic. The SIG 304 may further receive a frame clock, a sub-frame clock from the WiMAX module 102, and a native reference clock from the clock source 105 of the mobile communications device 100. The frame clock and sub-frame clock indicate the start and end of each WiMAX frame and sub-frame of the serving BS. The native reference clock is a native clock of the mobile communications device 100 and is used to convert the received traffic pattern, the frame clock, and the sub-frame clock into finer granularity. The SIG 304 may further generate a CLC WiMAX frame or sub-frame bitmap indicating recommended downlink and/or uplink traffic allocations by using the native reference clock to map the received traffic pattern to one of the frame clock and the sub-frame clock. If the duration of the received traffic pattern is longer than a predefined threshold, e.g. a half of the duration of a WiMAX frame, the SIG 304 may generate a CLC WiMAX frame bitmap. Otherwise, the SIG 304 may generate a CLC WiMAX sub-frame bitmap. In the CLC WiMAX frame or sub-frame bitmap, each bit indicates whether the WiMAX radio activity is recommended to schedule an activity for the IEEE 802.16 radio module 102 in a corresponding WiMAX frame or sub-frame. A bit of the CLC WiMAX frame or sub-frame bitmap is set to 1 when no CLC radio activity will be active in a corresponding frame or sub-frame, and set to 0 otherwise. Specifically, each bit of the CLC WiMAX sub-frame is set to 0 to recommend the serving base station not to allocate downlink or uplink traffic for the IEEE 802.16 radio module 102 in a corresponding sub-frame, and set to 1 to recommend the serving base station can freely schedule downlink or uplink traffic for the IEEE 802.16 radio module 102 in a corresponding sub-frame. At the beginning, two CLC WiMAX frame or sub-frame bitmaps will be generated, one is for suggesting WiMAX DL traffic allocation and the other is for suggesting WiMAX UL traffic allocation. A DL CLC WiMAX frame or sub-frame bitmap records the transmission activities of the CLC radio and an UL CLC WiMAX frame or sub-frame bitmap records the reception activities of the CLC radio. For Time-Division Duplex system, the DL and UL CLC WiMAX frame or sub-frame bitmaps may be merged into one single bitmap regarding that only the transmission activities are taken into account in DL periods and only reception activities are taken into account in UL periods. For Frequency-Division Duplex system, the DL and UL CLC WiMAX frame or sub-frame bitmaps should remain separated as two bitmaps. In addition, the SIG 304 may indicate the starting frame or sub-frame of the generated CLC WiMAX frame or sub-frame bitmap. Note that the TPG 301, 302, 303, or SIG 304 may be implemented in program code or instructions executable by a processing unit of the mobile communications device 100, and when executed, performs the mentioned operations.

Figure 8:
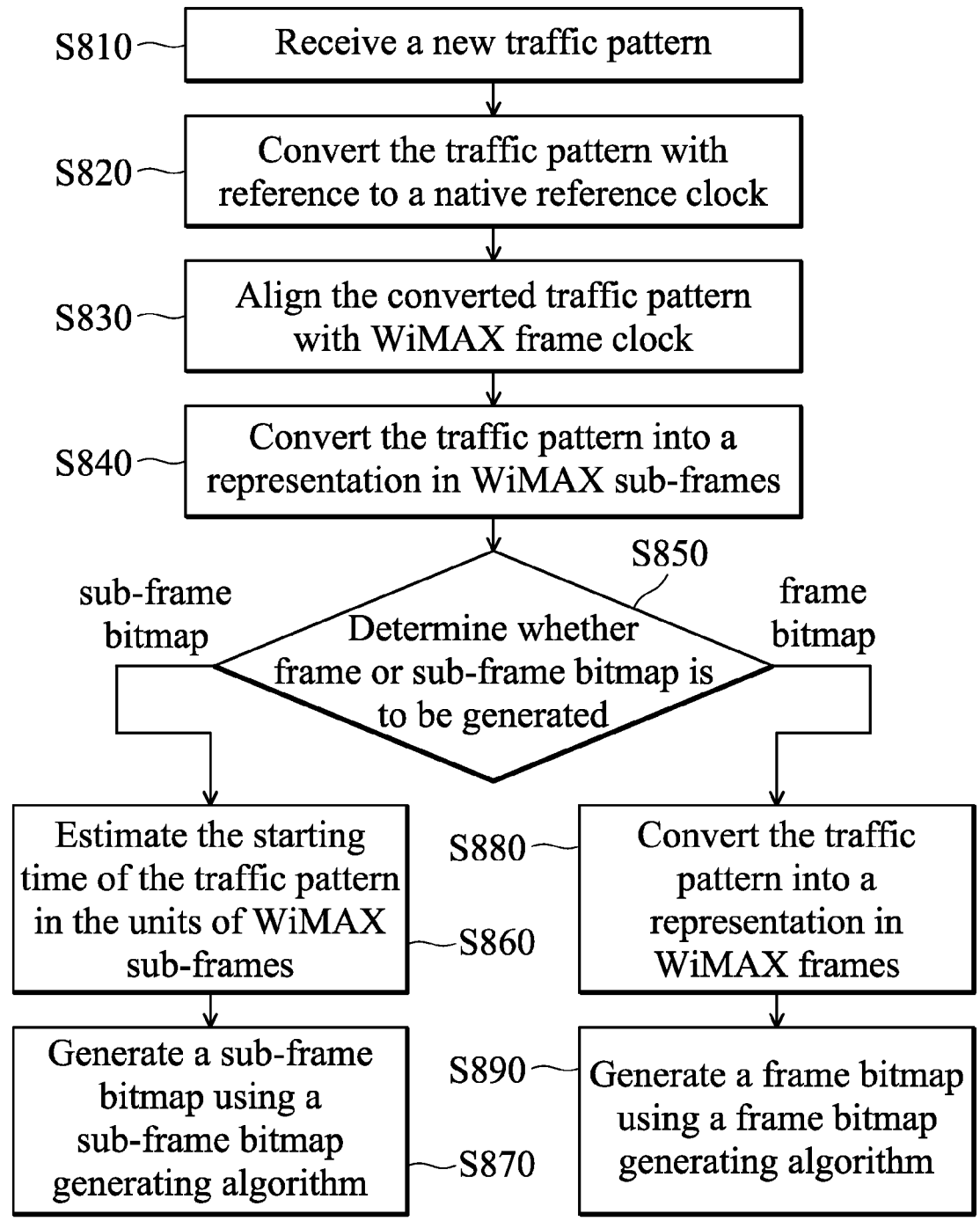
FIG. 8 is a flow chart illustrating the synchronized activity bitmap generation method according to an embodiment of the invention.
Figure 9:
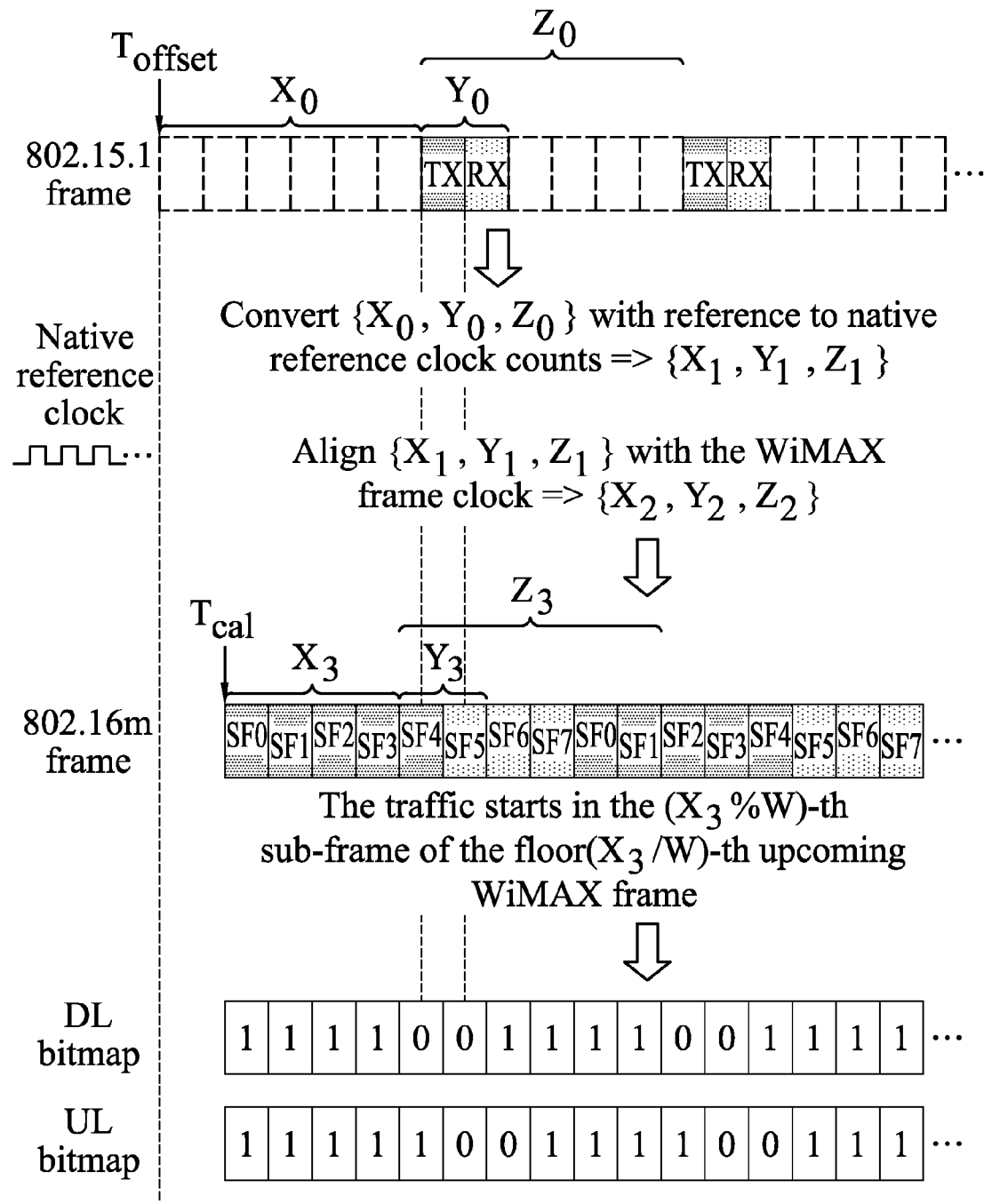
FIG. 9 is a schematic diagram illustrating traffic patterns of an IEEE 802.15.1 transmitting (Tx) and receiving (Rx) data frame allocation and an IEEE 802.16m downlink (DL) and uplink (UL) data frame allocation according to an embodiment of the invention.

FIG. 8 is a flow chart illustrating the synchronized activity bitmap generation method according to an embodiment of the invention. The method may operate in a communications device which comprises a plurality of radio modules, such as the mobile communications device 100 as shown in FIG. 1. The following description of the method takes the mobile communications device 100 as an exemplary scenario, but the invention is not limited thereto. Regarding detailed description of the mobile communications device 100, reference may be made to FIG. 1. The method beings with the mobile communications device 100 receiving a traffic pattern from one of the CLC radio modules (step 810). Upon receiving the traffic pattern, the SIG 304 converts the traffic pattern with reference to a native reference clock (S820). For example, the traffic pattern received from the IEEE 802.15.1 radio module 103 may be a BT Tx SCO traffic pattern $\{X_0, Y_0, Z_0\}$, which represents that the traffic pattern will start in $X_0$ seconds and last for $Y_0$ seconds with a repeating interval of $Z_0$ seconds, as shown in FIG. 9. The native reference clock counts, $T_{offset}$, records the time when the traffic pattern is received. Values of the traffic pattern may be converted into native reference clock counts as $\{X_1, Y_1, Z_1\}$, in which $X_1$ equals $(X_0 {*} M) + T_{offset}$, $Y_1$ equals $(Y_0 {*} M)$, and $Z_1$ equals $(Z_0 {*} M)$, wherein M is the clock rate of the native reference clock. After the traffic pattern is converted with reference to the native reference clock, the SIG 304 aligns the converted traffic pattern with the WiMAX frame clock received from the IEEE 802.16 radio module 102 (step S830). The aligned traffic pattern may be represented as $\{X_2, Y_2, Z_2\}$, in which $X_2$ equals $X_1 - T_{cal}$, $Y_2$ equals $Y_1$, and $Z_2$ equals $Z_1$, wherein $T_{cal}$ is a native reference clock count for the rising edge of the latest WiMAX frame. After the converted traffic pattern is aligned with the WiMAX frame clock, the SIG 304 converts the aligned traffic pattern into a representation in WiMAX sub-frames (step S840). Specifically, the relationship between the WiMAX sub-frame clock and native reference clock is first identified by finding the difference of native reference clock counts between two adjacent WiMAX sub-frames. In an embodiment, the difference N may be obtained by recoding a native reference clock count when the rising edge of one WiMAX sub-frame as N1, and a native reference clock count when the rising edge of the next WiMAX sub-frame as N2, and subtracting N1 from N2. The length of one WiMAX sub-frame can be considered as N native reference clock counts long. Subsequently, the aligned traffic pattern may be converted into a representation in WiMAX sub-frames as $\{X_3, Y_3, Z_3\}$, in which $X_3$ equals floor($X_2/N$), $Y_3$ equals ceiling($Y_2/N$), and $Z_3$ equals floor($Z_2/N$), as shown in FIG. 9. Additionally, if ($X_2 \% N$) does not equal zero, then $Y_3$ is increased by 1 to compensate for potential error since floor($X_2/N$) may cause the starting time of the traffic pattern to advance. Similarly, if ($Z_2 \% N$) does not equal zero, then $Y_3$ is increased by 1.

After the aligned traffic pattern is converted into a representation in WiMAX sub-frames, the SIG 304 determines whether a CLC WiMAX frame or sub-frame bitmap should be generated (step S850) by comparing the duration of the received traffic pattern with a predefined threshold. As an example, a CLC WiMAX sub-frame bitmap is to be generated if the duration of the received traffic pattern is shorter than half of the duration of a WiMAX frame. Otherwise, a CLC WiMAX frame bitmap is to be generated. Subsequent to step S850, if a CLC WiMAX sub-frame bitmap is determined to be generated, the SIG 304 further estimates the starting time of the received traffic pattern in the units of WiMAX sub-frames (step S860). Assuming that one WiMAX frame comprises W WiMAX sub-frames, the received traffic pattern may be predicted to start in the $W_{sf}$-th sub-frame of the $W_f$-th upcoming WiMAX frame, wherein $W_{sf}$ equals ($X_3 \% W$) and $W_f$ equals floor($X_3/W$), as shown in FIG. 9. The SIG 304 generates a DL CLC WiMAX sub-frame bitmap using a sub-frame bitmap generating algorithm (step S870). An UL CLC WiMAX sub-frame bitmap may be generated in the same step described above when the SIG 304 receives a BT Rx SCO traffic pattern, as shown in FIG. 9. An exemplary implementation of the sub-frame bitmap generating algorithm is shown below:

```
Algorithm CLC WiMAX sub-frame bitmap generating algorithm
```
Input: Assume a received traffic will start from the $W_{sf}$-th sub-frame of
the $W_f$-th WiMAX frame, last for $Y_3$ WiMAX sub-frames, and repeat
every $Z_3$ sub-frames.
The length of the generated WiMAX sub-frame bitmap is B bytes
Output: A WiMAX sub-frame bitmap array Wsf_BITMAP[B*8] to
indicate that the traffic will start from the $W_f$-th WiMAX frame
Int i = 0, $N_{WSF} = W_{sf}$, $N_Y = Y_3$, $N_Z = Z_3-Y_3$;
for (i = 0 ; i < $N_{WSF}$ ; i++)
{
    Wsf_BITMAP[i] = 1;
}
if ($N_Z$ == 0)
{
    for (; i < B*8 ; i++)
    {
        Wsf_BITMAP[i] = 0;
    }
}
else
{
    while (1)
    {
        while (($N_Y$ !=0) && (i < B*8))
        {
            Wsf_BITMAP[i++] = 0;
            $N_Y$--;
        }
        while (($N_Z$ !=0) && (i < B*8))
        {
            Wsf_BITMAP[i++] = 1;
            $N_Z$--;
        }
        if (i < B*8)
        {
            $N_Y = Y_3$, $N_Z = Z_3-Y_3$;
        }
        else
        {
            break;
        }
    }
}

Subsequent to step S850, if a CLC WiMAX frame bitmap is to be generated, the SIG 304 further converts the traffic pattern into a representation in WiMAX frames to estimate the starting time of the received traffic pattern in the units of WiMAX frames (step S880). The converted traffic pattern in WiMAX frames may be represented as $\{X_4, Y_4, Z_4\}$, wherein $X_4$ equals floor($X_3$/W), $Y_4$ equals ceiling($Y_3$/W), and $Z_4$ equals floor($Z_3$/W), assuming that one WiMAX frame is composed of W WiMAX sub-frames. Additionally, if ($Z_4$% N) does not equal zero, then $Y_4$ is increased by 1 to compensate for potential error since floor($X_3$/W) may cause the starting time of the traffic pattern to advance. Similarly, if ($Z_4$% W) does not equal zero, then $Y_4$ is increased by 1. With the converted results, the starting time of the traffic pattern may be predicted to occur in the $X_4$-th upcoming WiMAX frame, last for $Y_4$ frames, and repeat every $Z_4$ frames. The SIG 304 generates a CLC WiMAX frame bitmap using a frame bitmap generating algorithm (step S890). An exemplary implementation of the frame bitmap generating algorithm is shown below:

```
Algorithm CLC WiMAX frame bitmap generating algorithm
```
Input: Assume a received traffic will start from the $X_4$-th WiMAX frame,
last for $Y_4$ WiMAX frames, and repeat every $Z_4$ frames. The length of
the generated WiMAX frame bitmap is B bytes
Output: A WiMAX frame bitmap array Wf_BITMAP[B*8] to indicate
that the traffic will start from the $X_4$-th WiMAX frame -continued

```
Algorithm CLC WiMAX frame bitmap generating algorithm
```
Int i = 0, $N_Y = Y_4$, $N_Z = Z_4-Y_4$;
if ($N_Z$ == 0)
{
    for (; i < B*8 ; i++)
    {
        Wf_BITMAP[i] = 0;
    }
}
else
{
    while (1)
    {
        while (($N_Y$ !=0) && (i < B*8))
        {
            Wf_BITMAP[i++] = 0;
            $N_Y$--;
        }
        while (($N_Z$ !=0) && (i < B*8))
         {
            Wf_BITMAP[i++] = 1;
            $N_Z$--;
        }
        if (i < B*8)
        {
            $N_Y = Y_4$, $N_Z = Z_4-Y_4$;
        }
        else
        {
            break;
        }
    }
}

It is to be understood that, through steps S820 to S870, the CLC WiMAX sub-frame bitmap is generated by synchronizing the received traffic pattern with the timing information of the base station in the units of sub-frames. Also, through steps S820 to S840, and S880 to S890, the generation of the CLC WiMAX frame bitmap is performed by synchronizing the received traffic pattern with the timing information of the base station in the units of frames.

Figure 10:
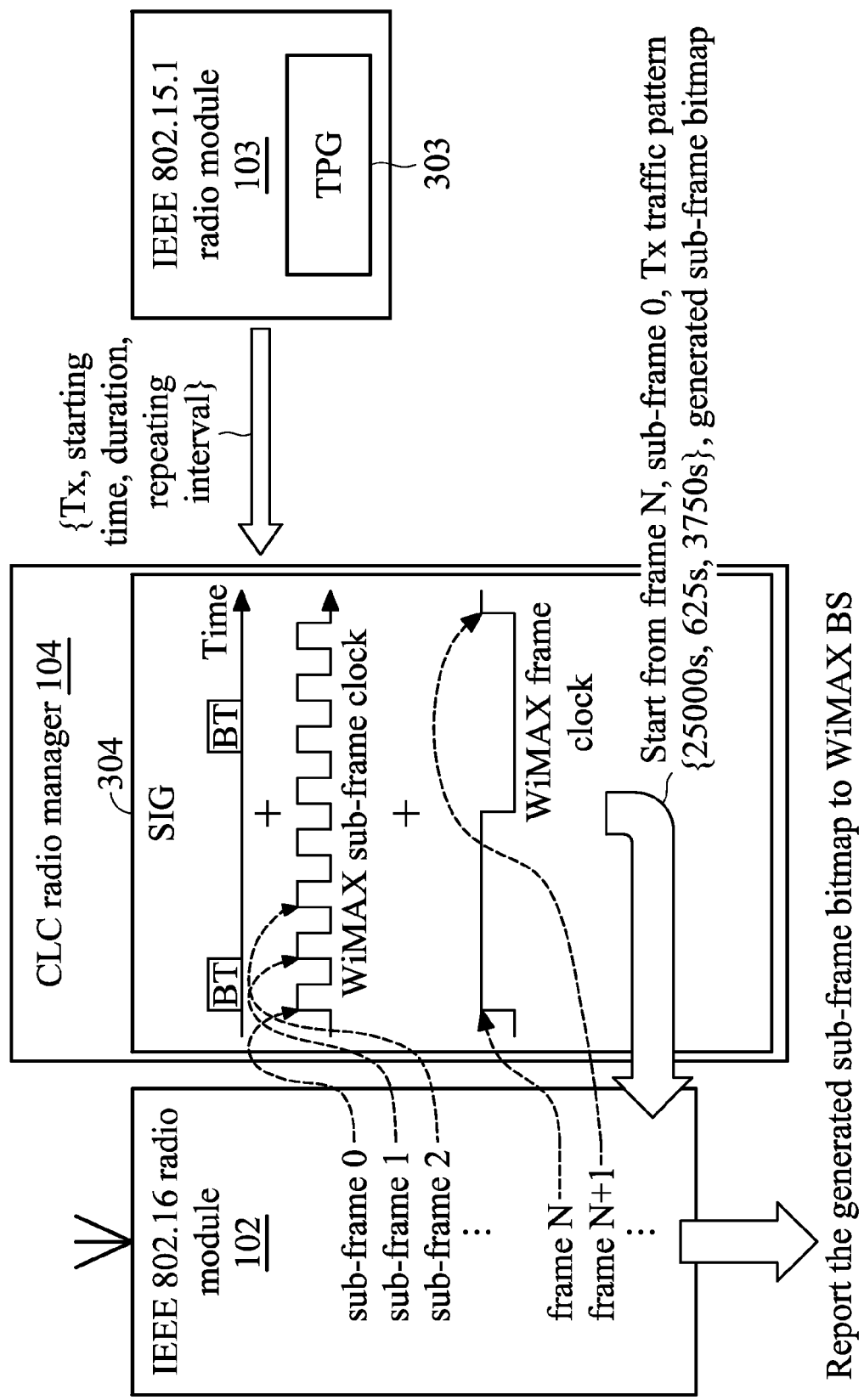
FIG. 10 is a block diagram illustrating the generation of an UL CLC WiMAX sub-frame bitmap for the received BT traffic pattern according to the embodiment in FIG. 8.

FIG. 10 is a block diagram illustrating the generation of an UL CLC WiMAX sub-frame bitmap for the received BT traffic pattern according to the embodiment in FIG. 8. The IEEE 802.15.1 radio module 103 may generate a BT Tx HV3 traffic pattern {25000 μs, 625 μs, 3750 μs}, which represents that the traffic will start in 25000 μs ($X_0$=0.025 s) and last for 625 μs ($Y_0$=0.000625 s) with a repeating interval of 3750 μs ($Z_0$=0.00375 s). Firstly, the traffic pattern is converted with reference to a native reference clock into $\{X_1=1725000, Y_1=625, Z_1=3750\}$, assuming that the traffic pattern is received at a native reference clock count of 1700000 ($T_{offset}$=1700000) with the clock rate of 1M Hz (M=1000000). Secondly, the converted traffic pattern is aligned with a WiMAX frame clock as $\{X_2=15000, Y_2=625, Z_2=3750\}$, assuming that the next WiMAX frame occurs at a native reference clock count of 1710000 ($T_{cal}$=1710000). Thirdly, the aligned traffic pattern is further converted into a representation in WiMAX sub-frames as $\{X_3=24, Y_3=1, Z_3=6\}$, assuming that the length of one WiMAX sub-frame equals 625 native reference clock counts (N=625). Since the duration of the traffic pattern, i.e. 625 μs, is shorter than a half of a WiMAX frame, i.e. 2500 μs, a CLC WiMAX sub-frame bitmap is to be generated. Fourthly, the starting time of the traffic pattern is estimated to be in the 1$^{st}$ ($W_{sf}$=0) sub-frame of the 3$^{rd}$ ($W_f$=3) upcoming WiMAX frame, assuming that one WiMAX frame is composed of 8 sub-frames (W=8). Lastly, an UL CLC WiMAX sub-frame bitmap is generated as Wsf_BITMAP[24]={0, 1, 1, 1, 1, 1, 0, 1, 1, 1, 1, 1, 0, 1, 1, 1, 1, 1, 0, 1, 1, 1, 1, 1}, in which the length of the CLC WiMAX sub-frame bitmap is determined according to the least common multiple (LCM) of the CLC radio traffic repeating cycle length and the WiMAX sub-frame/frame interval (i.e. LCM (3750, 5000)/5000=3 bytes) and using the sub-frame bitmap generating algorithm with $N_{wsf}=0$, $N_Y=1$, $N_Z=5$.

Figure 11:
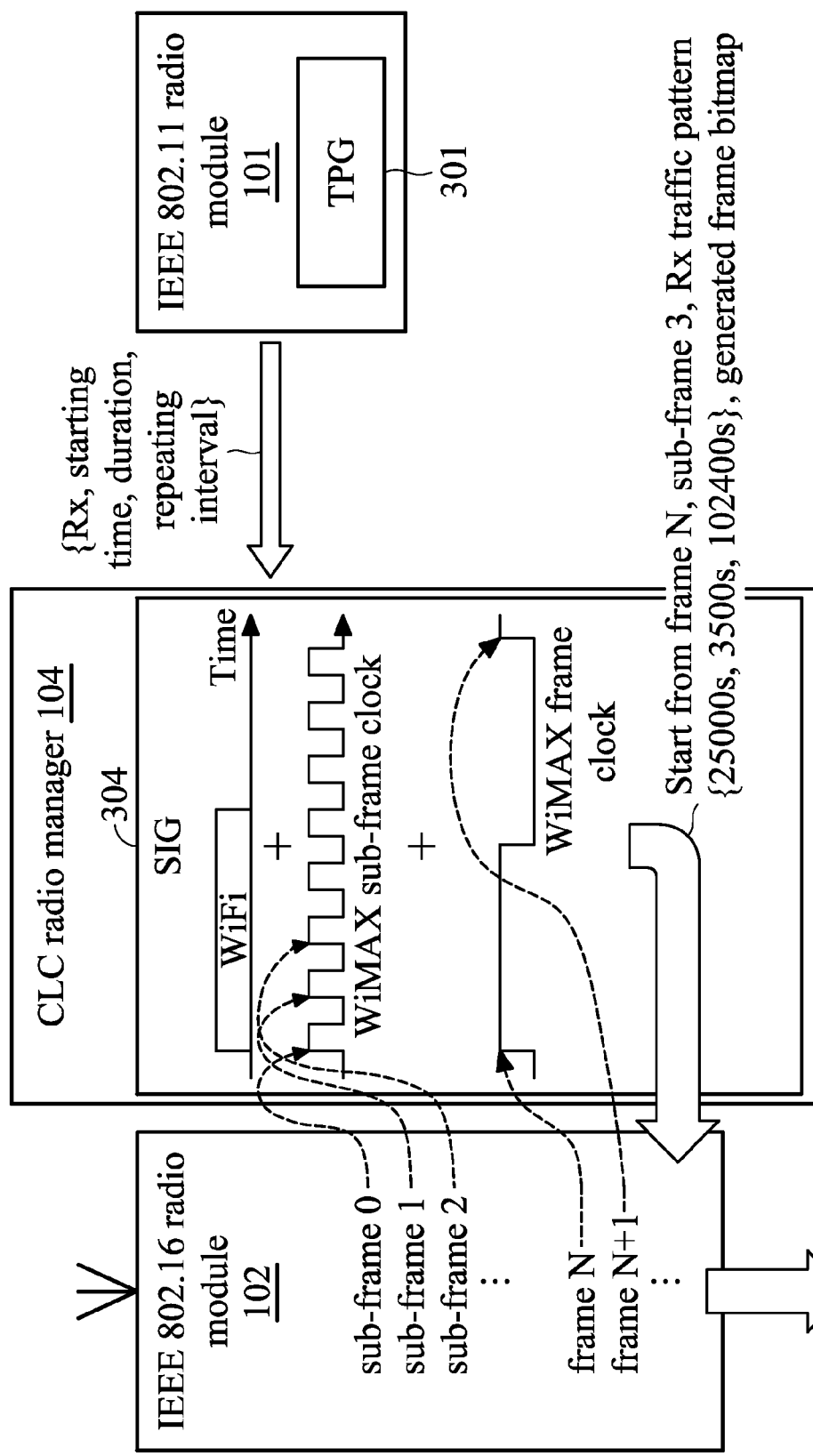
FIG. 11 is a block diagram illustrating the generation of a DL CLC WiMAX frame bitmap for the received WiFi traffic pattern according to the embodiment in FIG. 8.

FIG. 11 is a block diagram illustrating the generation of a DL CLC WiMAX frame bitmap for the received WiFi traffic pattern according to the embodiment in FIG. 8. The IEEE 802.11 radio module 101 may generate a WiFi Rx Beacon traffic pattern {25000 μs, 3500 μs, 102400 μs}, which represents that the traffic will start in 25000 μs ($X_0$=0.025 s) and last for 3500 μs ($Y_0$=0.0035 s) with a repeating interval of 102400 μs ($Z_0$=0.1024 s). Firstly, the traffic pattern is converted with reference to a native reference clock into {$X_1$=1725000, $Y_1$=3500, $Z_1$=102400}, assuming that the traffic pattern is received at a native reference clock count of 1700000 ($T_{offset}$=1700000) with the clock rate of 1M Hz (M=1000000). Secondly, the converted traffic pattern is aligned with a WiMAX frame clock as {$X_2$=15000, $Y_2$=3500, $Z_2$=102400}, assuming that the next WiMAX frame occurs at a native reference clock count of 1710000 ($T_{cal}$=1710000). Thirdly, the aligned traffic pattern is further converted into a representation in WiMAX sub-frames as {$X_3$=24, $Y_3$=7, $Z_3$=163}, assuming that the length of one WiMAX sub-frame clock equals 625 native reference clock counts (N=625). Since the duration of the traffic pattern, i.e. 3500 μs, is longer than a half of a WiMAX frame, i.e. 2500 μs, a CLC WiMAX frame bitmap is to be generated. Fourthly, the traffic pattern is converted into a representation in WiMAX frames as {$X_4$=3, $Y_4$=2, $Z_4$=20}, assuming that one WiMAX frame is composed of 8 sub-frames (W=8). That is, the starting time of the traffic pattern is estimated to be in the $3^{rd}$ ($X_4$=3) upcoming WiMAX frame and last for 2 WiMAX frames, with a repeating interval of 20 WiMAX frames. Lastly, a CLC WiMAX frame bitmap is generated as Wf_BITMAP[24]={0, 0, 1, 1, 1, 1, 1, 1, 1, 1, 1, 1, 1, 1, 1, 1, 1, 1, 1, 0, 0, 1, 1}, by using the frame bitmap generating algorithm with $X_4$=3, $N_Y$=2, $N_Z$=20, wherein the length of the CLC WiMAX frame bitmap is set to 3 bytes by a user.

Figure 12:
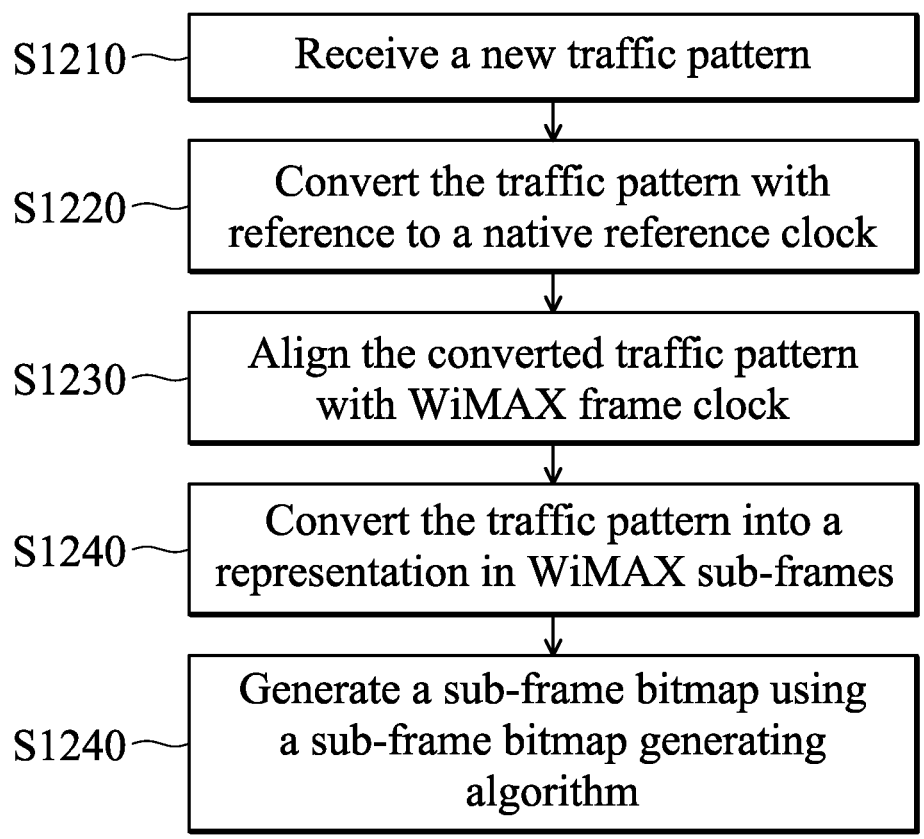
FIG. 12 is a flow chart illustrating the synchronized activity bitmap generation method according to another embodiment of the invention.

FIG. 12 is a flow chart illustrating the synchronized activity bitmap generation method according to another embodiment of the invention. The method may operate in a communications device which comprises a plurality of radio modules, such as the mobile communications device 100 as shown in FIG. 1. The following description of the method takes the mobile communications device 100 as an exemplary scenario, but the invention is not limited thereto. Regarding detailed description of the mobile communications device 100, reference may be made to FIG. 1. The method beings with the mobile communications device 100 receiving a traffic pattern from one of the CLC radio modules (step 1210).

Figure 13:
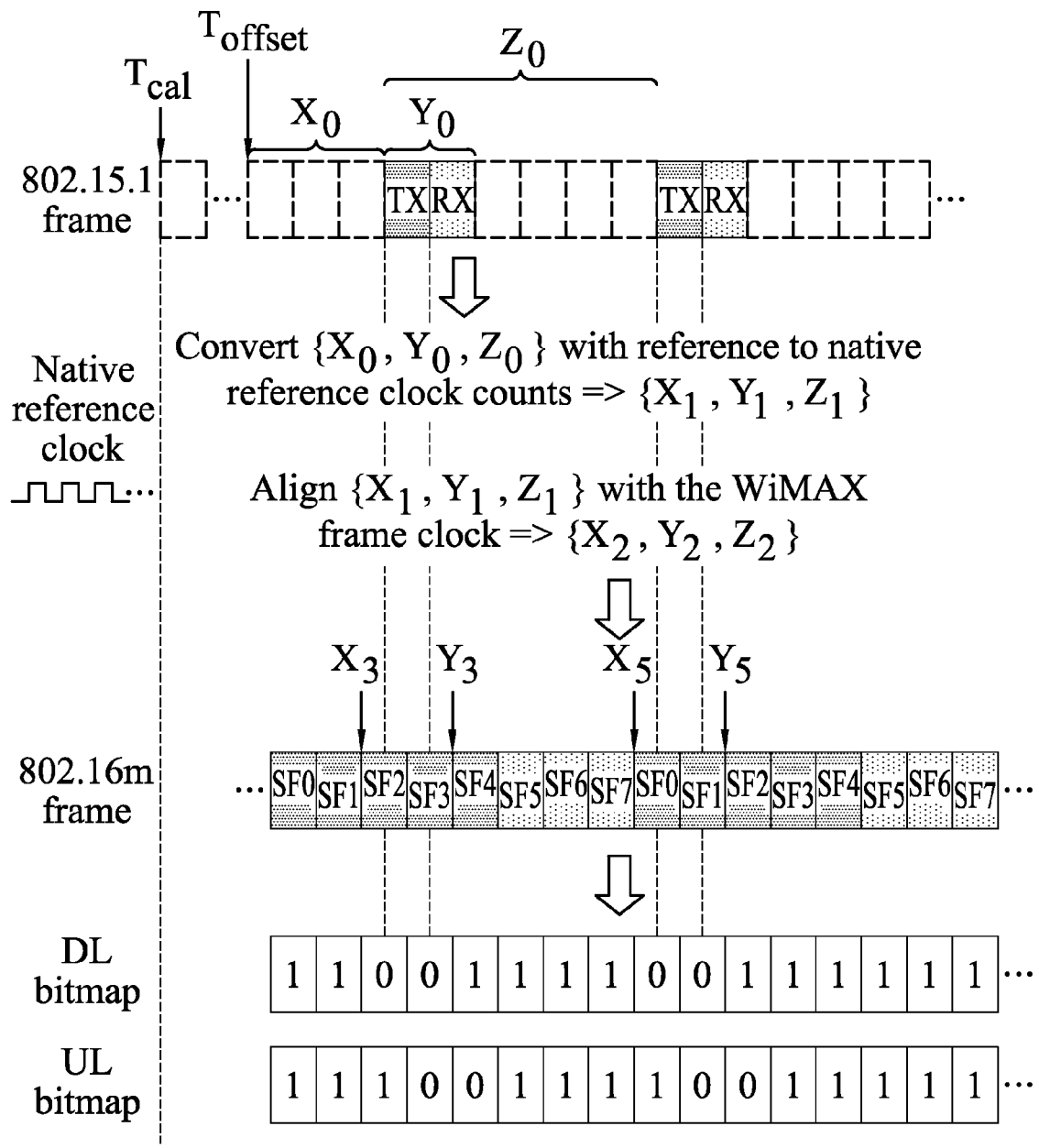
FIG. 13 is a schematic diagram illustrating traffic patterns of BT Tx and Rx data frame allocations and a WiMAX DL and UL data frame allocation according to another embodiment of the invention.

Upon receiving the traffic pattern, the SIG 304 converts the traffic pattern with reference to a native reference clock (S1220). For example, the traffic pattern received from the IEEE 802.15.1 radio module 103 may be a BT Tx SCO traffic pattern {$X_0$, $Y_0$, $Z_0$}, which represents that the traffic pattern will start in $X_0$ seconds and last for $Y_0$ seconds with a repeating interval of $Z_0$ seconds, as shown in FIG. 13. In the embodiment as shown in FIG. 8, the native reference clock count, $T_{cal}$, of the starting time of a first WiMAX frame after the traffic pattern is received is considered as an anchor point, while in this embodiment, the native reference clock count of the starting time of a latest WiMAX frame before the traffic pattern is received is considered as the anchor point. After values of the traffic pattern are converted into native reference clock counts as {$X_1$, $Y_1$, $Z_1$}, in which $X_1$ equals ($X_0$*M)+$T_{offset}$, $Y_1$ equals ($Y_0$*M), and $Z_1$ equals ($Z_0$*M), wherein M is the clock rate of the native reference clock, the converted traffic pattern is aligned with WiMAX frame clocks (step S1230). The aligned traffic pattern may be represented as {$X_2$, $Y_2$, $Z_2$}, wherein $X_2$ equals ($X_1-T_{cal}$) % $T_{frm\_durn}$, $Y_2$ equals $X_2+Y_1$, and $Z_2$ equals $Z_1$. If the next WiMAX frame after the WiMAX frame marked with $T_{cal}$ starts between $T_{offset}$ and $X_1$, then $X_2$ will be longer than the duration of a WiMAX frame, i.e. $T_{frm\_durn}$. The modulo operation is used to make sure that $X_2$ is shorter than the duration of a WiMAX frame. After the traffic pattern is aligned with the WiMAX frame clock, the aligned traffic pattern is further converted into a representation in WiMAX sub-frames (step S1240). The converted traffic pattern in WiMAX sub-frames may be represented as {$X_3$, $Y_3$}, wherein $X_3$ and $Y_3$ indicate the starting and ending sub-frame during every repetition of the traffic pattern. $X_3$ is calculated by an equation $X_3$=floor($X_2$/N), and $Y_3$ is calculated by an equation $Y_3$=floor($Y_2$/N), assuming that the length of one WiMAX sub-frame equals N native reference clock counts as described above. That is, the traffic pattern will start in the $X_3$-th and end in the $Y_3$-th WiMAX sub-frame of the next WiMAX frame in the first repetition. Similarly, the native reference clock counts of the second repetition of the traffic pattern may be presented as {$X_4$, $Y_4$}, wherein $X_4$ equals ($X_2+Z_2$) % $T_{frm\_durn}$ and $Y_4$ equals $X_4+Y_1$. Subsequently, the second repetition of the traffic pattern may be converted into a representation in WiMAX sub-frames as {$X_5$, $Y_5$}, wherein $X_5$ equals floor ($X_4$/N) and $Y_5$ equals floor($Y_4$/N). That is, the second repetition of the traffic pattern will start in the $X_5$-th, and end in the $Y_5$-th WiMAX sub-frame of the next WiMAX frame if $X_2+Z_2$ exceeds $T_{frm\_durn}$. Thus, the CLC WiMAX sub-frame bitmap is generated (step S1250) by repeating the process described in step S1240 until the starting time of the traffic pattern in the next repetition exceeds $X_1$+LCM($Z_1$, 5000 μs). An exemplary implementation of the sub-frame bitmap generating algorithm in step S1240 is shown below:

Algorithm CLC WiMAX sub-frame bitmap generating algorithm

Input: Assume a received traffic will start at $X_1$ and the length of the generated WiMAX sub-frame bitmap is B bytes
Output: A WiMAX sub-frame bitmap array Wsf_BITMAP[B*8] to describe the traffic with WiMAX sub-frames. Sub-frame bitmap index for certain frame ranges from 0 to 7
T_WMX_FRM_DURN = 5000;
first_strt_time = $X_1$;
traffic_cycle = $Z_1$;
traffic_duration = $Y_1$;
wmx_frm_strt = $T_{cal}$ + T_WMX_FRM_DURN * FLOOR(($X_1-T_{cal}$)/T_WMX_FRM_DURN)
next_traffic_strt_time = ($X_1-T_{cal}$) mod T_WMX_FRM_DURN;
next_traffic_end_time = next_traffic_strt_time + traffic_duration;

-continued

| Algorithm CLC WiMAX sub-frame bitmap generating algorithm |
|---|

```
frm_index = 0;
tmp_end = 0;
tmp_start = 0;
while ((next_traffic_strt_time + wmx_frm_strt) < (first_strt_time +
LCM(T_WMX_FRM_DURN, Z_2)))
{
    wmx_frm_strt = next_traffic_strt_time +
                   T_WMX_FRM_DURN *
                   FLOOR(next_traffic_strt_time/T_WMX_FRM_DURN);
    //to next frame if needed
    frm_index = frm_index + FLOOR(next_traffic_strt_time/T_WMX_FRM_DURN);
    next_traffic_strt_time = next_traffic_strt_time mod T_WMX_FRM_DURN;
    strt = FLOOR(next_traffic_strt_time/N);
    end = FLOOR(next_traffic_end_time/N);
    for (i = strt; i <= end; i++)
    {
        Wsf_BITMAP[i+ (frm_index*8)] = 1;
    }
    if (tmp_end != 0)
    {
        tmp_start = next_traffic_strt_time;
        next_traffic_strt_time = 0;
        next_traffic_end_time = tmp_end;
        wmx_frm_strt = wmx_frm_strt + T_WMX_FRM_DURN;
        tmp_end = 0;
        frm_index = frm_index + 1;
    }
    else if (tmp_start != 0)
    {
        next_traffic_strt_time = tmp_start + traffic_cycle;
        next_traffic_end_time = next_traffic_strt_time + traffic_duration;
        tmp_start = 0;
    }
    else
    {
        next_traffic_strt_time = next_traffic_strt_time + traffic_cycle;
        next_traffic_end_time = next_traffic_strt_time + traffic_duration;
    }
            //handling boundary case(traffic duration cross frame boundary)
    if (next_traffic_end_time > T_WMX_FRM_DURN)
    {
        tmp_end = next_traffic_end_time - T_WMX_FRM_DURN;
        next_traffic_end_time = T_WMX_FRM_DURN - 1;
    }
    else if (next_traffic_end_time == T_WMX_FRM_DURN)
    {
        next_traffic_end_time = T_WMX_FRM_DURN - 1;
    }
}
```

It is to be understood that, through steps S1220 to S1240, the CLC WiMAX sub-frame bitmap is generated by synchronizing the received traffic pattern with the timing information of the base station in the units of sub-frames.

Figure 14:
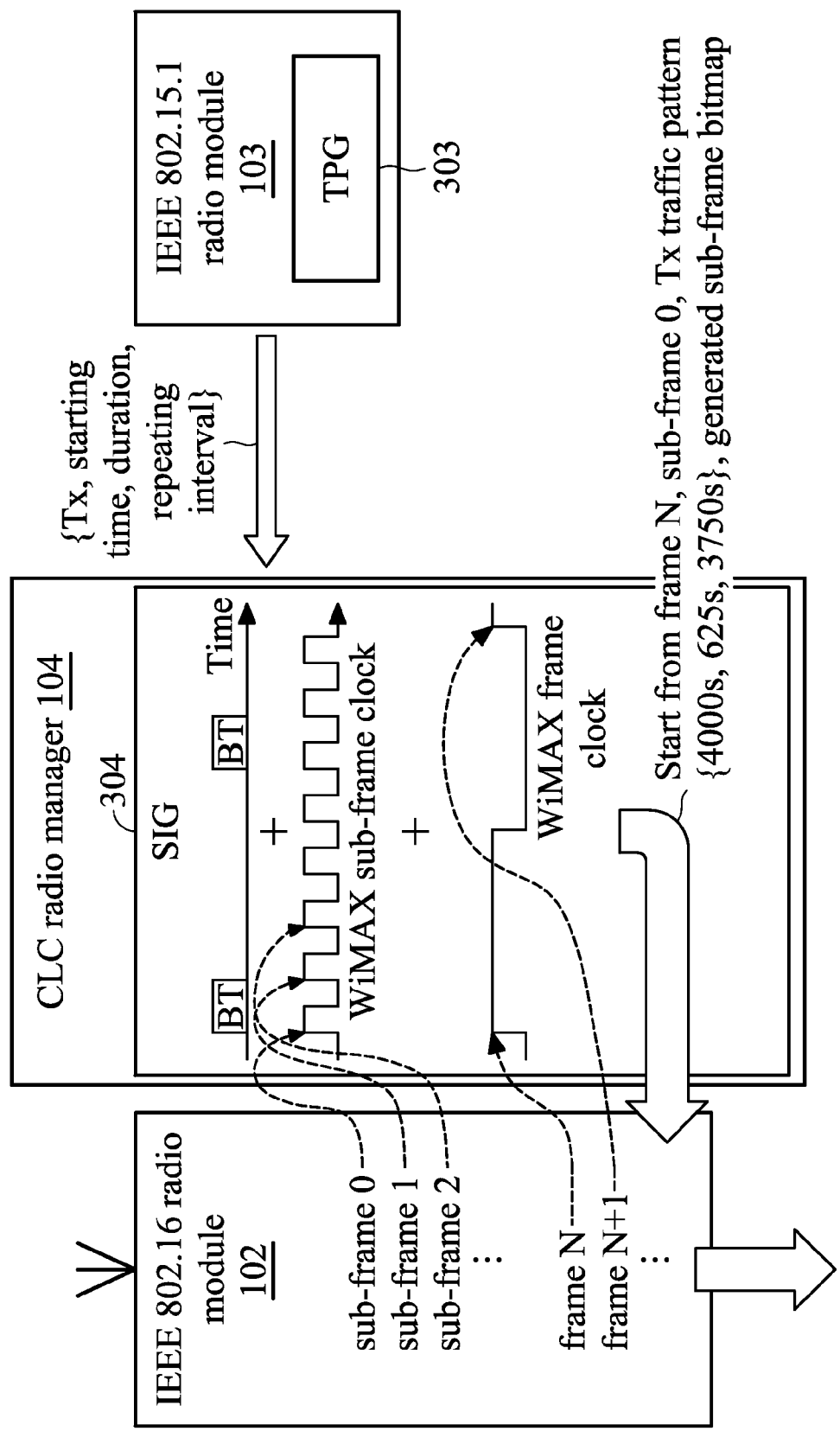
FIG. 14 is a block diagram illustrating the generation of an UL CLC WiMAX sub-frame bitmap for the received BT traffic pattern according to the embodiment in FIG. 12.

FIG. 14 is a block diagram illustrating the generation of an UL CLC WiMAX sub-frame bitmap for the received BT traffic pattern according to the embodiment in FIG. 12. The IEEE 802.15.1 radio module 103 may generate a BT Tx HV3 traffic pattern {4000 μs, 625 μs, 3750 μs}, which represents that the traffic will start in 4000 μs ($X_0$=0.004 s) and last for 625 μs ($Y_0$=0.000625 s) with a repeating interval of 3750 μs ($Z_0$=0.00375 s). Firstly, the traffic pattern is converted with reference to a native reference clock into {$X_1$=1704000, $Y_1$=625, $Z_1$=3750}, assuming that the traffic pattern is received at a native reference clock count of 1700000 ($T_{offset}$=1700000) with the clock rate of 1M Hz (M=1000000). Secondly, the converted traffic pattern is aligned with a WiMAX frame clock as {$X_2$=2000, $Y_2$=2625, $Z_2$=3750}, assuming that the latest WiMAX frame before the traffic pattern is received occurs at a native reference clock count of 1697000 ($T_{cal}$=1697000). Thirdly, the aligned traffic pattern is further converted into a representation in WiMAX sub-frames as {$X_3$=3, $Y_3$=4}, assuming that the length of one WiMAX sub-frame clock equals 625 native reference clock counts (N=625). Since the duration of the traffic pattern, i.e. 625 μs, is shorter than a half of a WiMAX frame, i.e. 2500 μs, a CLC WiMAX sub-frame bitmap is to be generated. That is, the first repetition of the traffic pattern is estimated to start in the $3^{rd}$ sub-frame and end in the $4^{th}$ sub-frame of the WiMAX frame (noted as frame N). Similarly, the native reference clock counts of the second repetition of the traffic pattern are calculated and may be represented as {$X_4$=750, $Y_4$=1375}. The second repetition of the traffic pattern may be converted into a representation in WiMAX sub-frames as {$X_5$=1, $Y_5$=2}. That is, the second repetition of the traffic pattern is estimated to start in the $1^{st}$ sub-frame and end in the $2^{nd}$ sub-frame of the next WiMAX frame (noted as frame N+1). Subsequently, the native reference clock counts of the third repetition of the traffic pattern are calculated and may be represented as {$X_6$=4500, $Y_6$=4999}. The third repetition of the traffic pattern may be converted into a representation in WiMAX sub-frames as {$X_7$=7, $Y_7$=7} and following with {$X_8=0, Y_8=0$}. That is, the third repetition of the traffic pattern is estimated to start in the $7^{sh}$ sub-frame, which is the same WiMAX frame $X_5$ is in (frame N+1), and end in the $0^{th}$ sub-frame of the next WiMAX frame (noted as frame N+2). Next, the native reference clock counts of the fourth repetition of the traffic pattern are calculated and may be represented as {$X_9=3250, Y_9=3875$}. That is, the fourth repetition of the traffic pattern is estimated to start in the $5^{st}$ sub-frame and end in the $6^{th}$ sub-frame, which is the same WiMAX frame $X_8$ is in (frame N+2). The repeating process ends since the starting time, i.e. $X_{10}=7122000$, of the traffic pattern in the next repetition exceeds 1704000+LCM(3750, 5000). Thus, the DL CLC WiMAX sub-frame bitmap is generated as Wsf_BITMAP[24]={1, 1, 1, 0, 0, 1, 1, 1, 1, 0, 0, 1, 1, 1, 1, 0, 0, 1, 1, 1, 1, 0, 0, 1}. An UL CLC WiMAX sub-frame bitmap for BT Rx traffic pattern may be generated in the same manner.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile communications device, comprising:
   a clock source;
   a first radio module communicating with a communications device in compliance with a first protocol;
   a second radio module communicating with a base station in compliance with a second protocol; and
   a Co-Located Coexistence (CLC) radio manager, comprising a processing circuit, receiving a traffic pattern from the first radio module indicating a first traffic allocation for the first radio module, obtaining timing information of the base station, obtaining a native reference clock from the clock source, converting values of the traffic pattern into the native reference clock counts, aligning the converted traffic pattern with the timing information of the base station, converting the aligned traffic pattern into a plurality of OFDMA frames or OFDMA sub-frames of the timing information, generating one or more CLC bitmaps for the first radio module, and transmitting the generated CLC bitmaps to the base station via the second radio module to recommend a second traffic allocation of the OFDMA frames or the OFDMA sub-frames,
   wherein the second traffic allocation is an OFDMA traffic allocation and the timing information of the base station is a OFDMA frame clock or a OFDMA sub-frame clock;
   wherein the traffic pattern comprises information indicating whether the traffic pattern is for reception or for transmission, a duration indicating the length of time required by the traffic pattern for each repetition thereof, and a repeating interval of the traffic pattern.

2. The mobile communications device as claimed in claim 1, wherein each bit of the CLC bitmap is set to a first logic level to recommend the base station not to allocate downlink or uplink traffic for the second radio module in a corresponding frame or sub-frame, and set to a second logic level to recommend the base station can freely schedule downlink or uplink traffic for the second radio module in a corresponding frame or sub-frame.

3. The mobile communications device as claimed in claim 1, wherein the first radio module is a Bluetooth or WiFi radio module, and the second radio module is a OFDMA radio module.

4. A mobile communications device, comprising:
   a clock source;
   a first radio module communicating with a communications device in compliance with a first protocol;
   a second radio module communicating with a base station in compliance with a second protocol according to timing information of the base station; and
   a Co-Located Coexistence (CLC) radio manager, comprising a processing circuit, detecting activities of the first radio module, receiving a traffic pattern from the first radio module indicating a first traffic allocation for the first radio module, generating one or more CLC bitmaps of the first radio module by synchronizing the traffic pattern with the timing information of the base station, and transmitting the generated CLC bitmaps to the base station via the second radio module to recommend a second traffic allocation of a plurality of OFDMA sub-frames or OFDMA frames for the second radio module,
   wherein the second traffic allocation is an OFDMA traffic allocation and the timing information of the base station is a OFDMA frame clock or a OFDMA sub-frame clock, the synchronizing of the traffic pattern comprises receiving the timing information of the base station from the second radio module, receiving a native reference clock from the clock source, and synchronizing the traffic pattern with the timing information of the base station by the native reference clock,
   wherein the traffic pattern comprises information indicating whether the traffic pattern is for reception or for transmission, a duration indicating the length of time required by the traffic pattern for each repetition thereof, and a repeating interval of the traffic pattern.

5. The mobile communications device as claimed in claim 4, wherein the synchronizing of the traffic pattern further comprises converting values of the traffic pattern into native reference clock counts, aligning the converted traffic pattern with the timing information of the base station, and converting the aligned traffic pattern into units of the timing information of the base station, wherein the timing information indicates a plurality of frame or sub-frame starts.

6. The mobile communications device as claimed in claim 4, wherein the second radio module further receives, from the base station, a traffic schedule which is determined according to the generated CLC bitmaps, and receives or transmits data from or to the base station according to the traffic schedule.

7. The mobile communications device as claimed in claim 4, wherein each bit of the CLC bitmap is utilized to recommend to the base station whether to schedule an activity for the second radio module in a corresponding frame or sub-frame.

8. The mobile communications device as claimed in claim 7, wherein each bit of the CLC bitmap is set to a first logic level to recommend the base station not to allocate downlink or uplink traffic for the second radio module in a corresponding frame or sub-frame, and set to a second logic level to recommend the base station can freely schedule downlink or uplink traffic for the second radio module in a corresponding frame or sub-frame.

9. The mobile communications device as claimed in claim 4, wherein the timing information of the base station indicates a start and an end of a sub-frame.

10. The mobile communications device as claimed in claim 9, wherein the timing information of the base station further indicates a start and an end of a frame.

11. A synchronized activity bitmap generation method for a Co-located Coexistence (CLC) device comprising a first radio module communicating with a peer communications device in compliance with a first protocol and a second radio module communicating with a base station in compliance with a second protocol according to timing information of the base station, the synchronized activity bitmap generation method comprising:

obtaining a traffic pattern indicating a first traffic allocation for the first radio module; receiving the timing information of the base station;

receiving a native reference clock from a clock source;

synchronizing the traffic pattern with the timing information of the base station by the native reference clock;

generating one or more Co-Located Coexistence (CLC) bitmaps of the first radio module according to the synchronized results; and transmitting the generated CLC bitmaps to the base station via the second radio module to recommend a second traffic allocation of a plurality of OFDMA frames or OFDMA sub-frames for the second radio module, wherein the second traffic allocation is an OFDMA traffic allocation and the timing information of the base station is a OFDMA frame clock or a OFDMA sub-frame clock, wherein the traffic pattern comprises information indicating whether the traffic pattern is for reception or for transmission, a duration indicating the length of time required by the traffic pattern for each repetition thereof, and a repeating interval of the traffic pattern.

12. The synchronized activity bitmap generation method as claimed in claim 11, wherein the synchronizing of the traffic pattern further comprises converting the traffic pattern into native reference clock counts, aligning the converted traffic pattern with the timing information of the base station, and converting the aligned traffic pattern into units of the timing information of the base station, wherein the timing information indicates a plurality of OFDMA frame or sub-frame starts.

13. The synchronized activity bitmap generation method as claimed in claim 11, further comprising: receiving, from the base station via the second radio module, a traffic schedule which is determined according to the generated CLC bitmaps, and receiving or transmitting data from or to the base station via the second radio module according to the traffic schedule.

14. The synchronized activity bitmap generation method as claimed in claim 11, wherein each bit of the CLC bitmap is utilized to recommend to the base station whether to schedule an activity for the second radio module in a corresponding frame or sub-frame.

15. The synchronized activity bitmap generation method as claimed in claim 14, wherein each bit of the sub-frame bitmap is set to a first logic level to recommend the base station not to allocate downlink or uplink traffic for the second radio module in a corresponding OFDMA frame or sub-frame, and set to a second logic level to recommend the base station can freely schedule downlink or uplink traffic for the second radio module in a corresponding frame or sub-frame.

16. A mobile communications device, comprising:
a clock source;
a first radio module communicating with a communications device in compliance with a first protocol;
a second radio module communicating with a base station in compliance with a second protocol; and
a Co-Located Coexistence (CLC) radio manager, comprising a processing circuit, receiving a traffic pattern from the first radio module indicating a first traffic allocation for the first radio module, obtaining timing information of the base station, obtaining a native reference clock from the clock source, converting values of the traffic pattern into the native reference clock counts, aligning the converted traffic pattern with the timing information of the base station, converting the aligned traffic pattern into a plurality of OFDMA frames or OFDMA sub-frames of the timing information, generating one or more CLC bitmaps for the first radio module, and transmitting the generated CLC bitmaps to the base station via the second radio module to recommend a second traffic allocation of the OFDMA frames or the OFDMA sub-frames, wherein the second traffic allocation is an OFDMA traffic allocation and the timing information of the base station is a OFDMA frame clock or a OFDMA sub-frame clock;

wherein each bit of the CLC bitmap is set to a first logic level to recommend the base station not to allocate downlink or uplink traffic for the second radio module in a corresponding frame or sub-frame, and set to a second logic level to recommend the base station can freely schedule downlink or uplink traffic for the second radio module in a corresponding frame or sub-frame.

17. The mobile communications device as claimed in claim 16, wherein the first radio module is a Bluetooth or WiFi radio module, and the second radio module is a OFDMA radio module.

18. A mobile communications device, comprising:
a clock source;
a first radio module communicating with a communications device in compliance with a first protocol;
a second radio module communicating with a base station in compliance with a second protocol according to timing information of the base station; and
a Co-Located Coexistence (CLC) radio manager, comprising a processing circuit, detecting activities of the first radio module, receiving a traffic pattern from the first radio module indicating a first traffic allocation for the first radio module, generating one or more CLC bitmaps of the first radio module by synchronizing the traffic pattern with the timing information of the base station, and transmitting the generated CLC bitmaps to the base station via the second radio module to recommend a second traffic allocation of a plurality of OFDMA sub-frames or OFDMA frames for the second radio module, wherein the second traffic allocation is an OFDMA traffic allocation and the timing information of the base station is a OFDMA frame clock or a OFDMA sub-frame clock, the synchronizing of the traffic pattern comprises receiving the timing information of the base station, receiving a native reference clock from the clock source, and synchronizing the traffic pattern with the timing information of the base station by the native reference clock, wherein each bit of the CLC bitmap is set to a first logic level to recommend the base station not to allocate downlink or uplink traffic for the second radio module in a corresponding frame or sub-frame, and set to a second logic level to recommend the base station can freely schedule downlink or uplink traffic for the second radio module in a corresponding frame or sub-frame.

19. The mobile communications device as claimed in claim 18, wherein the synchronizing of the traffic pattern further comprises converting values of the traffic pattern into native reference clock counts, aligning the converted traffic pattern with the timing information of the base station, and converting the aligned traffic pattern into units of the timing information of the base station, wherein the timing information indicates a plurality of frame or sub-frame starts.

20. The mobile communications device as claimed in claim 18, wherein the second radio module further receives, from the base station, a traffic schedule which is determined according to the generated CLC bitmaps, and receives or transmits data from or to the base station according to the traffic schedule.

21. A synchronized activity bitmap generation method for a Co-located Coexistence (CLC) device comprising a first radio module communicating with a peer communications device in compliance with a first protocol and a second radio module communicating with a base station in compliance with a second protocol according to timing information of the base station, the synchronized activity bitmap generation method comprising:
  obtaining a traffic pattern indicating a first traffic allocation for the first radio module; receiving the timing information of the base station;
  receiving a native reference clock from a clock source;
  synchronizing the traffic pattern with the timing information of the base station by the native reference clock;
  generating one or more Co-Located Coexistence (CLC) bitmaps of the first radio module according to the synchronized results; and
  transmitting the generated CLC bitmaps to the base station via the second radio module to recommend a second traffic allocation of a plurality of OFDMA frames or OFDMA sub-frames for the second radio module,
  wherein the second traffic allocation is an OFDMA traffic allocation and the timing information of the base station is a OFDMA frame clock or a OFDMA sub-frame clock,
  wherein each bit of the CLC bitmap is set to a first logic level to recommend the base station not to allocate downlink or uplink traffic for the second radio module in a corresponding frame or sub-frame, and set to a second logic level to recommend the base station can freely schedule downlink or uplink traffic for the second radio module in a corresponding frame or sub-frame.

22. The synchronized activity bitmap generation method as claimed in claim 21, wherein the synchronizing of the traffic pattern further comprises converting the traffic pattern into native reference clock counts, aligning the converted traffic pattern with the timing information of the base station, and converting the aligned traffic pattern into units of the timing information of the base station, wherein the timing information indicates a plurality of OFDMA frame or sub-frame starts.

23. The synchronized activity bitmap generation method as claimed in claim 21, further comprising: receiving, from the base station via the second radio module, a traffic schedule which is determined according to the generated CLC bitmaps, and receiving or transmitting data from or to the base station via the second radio module according to the traffic schedule.

* * * * *